United States Patent
Funayama et al.

(10) Patent No.: US 11,895,110 B2
(45) Date of Patent: Feb. 6, 2024

(54) INFORMATION PROVISION SYSTEM, INFORMATION PROVISION METHOD, AND STORAGE MEDIUM

(71) Applicant: NEC Corporation, Tokyo (JP)

(72) Inventors: Chisato Funayama, Tokyo (JP); Masato Tsukada, Tokyo (JP); Keiichi Chono, Tokyo (JP); Yuka Ogino, Tokyo (JP); Hiroshi Imai, Tokyo (JP); Shoji Yachida, Tokyo (JP); Takashi Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 331 days.

(21) Appl. No.: 17/294,795

(22) PCT Filed: Nov. 21, 2018

(86) PCT No.: PCT/JP2018/042998
§ 371 (c)(1),
(2) Date: May 18, 2021

(87) PCT Pub. No.: WO2020/105142
PCT Pub. Date: May 28, 2020

(65) Prior Publication Data
US 2021/0409396 A1    Dec. 30, 2021

(51) Int. Cl.
*H04L 29/06* (2006.01)
*H04L 9/40* (2022.01)

(52) U.S. Cl.
CPC ...... *H04L 63/0861* (2013.01); *H04L 63/0492* (2013.01); *H04L 63/107* (2013.01); *H04L 63/20* (2013.01)

(58) Field of Classification Search
CPC .................................................. H04L 63/0861
See application file for complete search history.

(56) References Cited

U.S. PATENT DOCUMENTS

| 2004/0051644 | A1  | 3/2004 | Tamayama et al. |
| 2011/0047384 | A1* | 2/2011 | Jacobs ................ G06V 20/30 |
|              |     |        |          370/254 |

(Continued)

FOREIGN PATENT DOCUMENTS

| JP | 2004-110377 A | 4/2004 |
| JP | 2008158678    | 7/2008 |

(Continued)

OTHER PUBLICATIONS

International Search Report of PCT Application No. PCT/JP2018/042998 dated Feb. 26, 2019.

(Continued)

*Primary Examiner* — Jason K Gee

(57) ABSTRACT

Provided are a system, a method, and the like which contribute to more reliably and smoothly providing information relating to an authentication result to a person who has been subjected to authentication. An information provision system according to an embodiment of the present invention comprises: an authentication unit which authenticates an authentication subject, who is to be subjected to authentication, using a captured image of the authentication subject; a determination unit which, in accordance with information about the authentication subject or the conditions of the authentication subject, determines the transmission destination to which information relating to the authentication result is to be transmitted in order to notify the authentication subject of the authentication result; and a transmission unit which transmits the information to the determined transmission destination.

12 Claims, 17 Drawing Sheets

(56) References Cited

U.S. PATENT DOCUMENTS

| | | | |
|---|---|---|---|
| 2015/0086074 A1 | 3/2015 | Kasahara et al. | |
| 2015/0031785 A1 | 11/2015 | Reymann et al. | |
| 2019/0050631 A1* | 2/2019 | Hayase | G06T 7/38 |

FOREIGN PATENT DOCUMENTS

| | | | | |
|---|---|---|---|---|
| JP | 2016050845 A | 4/2016 | | |
| WO | 2009016846 A1 | 2/2009 | | |
| WO | 2013145874 A1 | 10/2013 | | |
| WO | 2015/168406 A1 | 11/2015 | | |
| WO | WO-2015168406 A1 * | 11/2015 | | G07B 15/00 |
| WO | 2016/025437 A1 | 2/2016 | | |
| WO | 2016/125603 A1 | 8/2016 | | |
| WO | 2017146160 A1 | 8/2017 | | |
| WO | 2018125121 A1 | 7/2018 | | |

OTHER PUBLICATIONS

JP Office Action for JP Application No. 2020-557081, dated Jul. 26, 2022 with English Translation.
Japanese Office Action for JP Application No. 2020-557081, dated Dec. 13, 2022 with English Translation.
Extended European Search Report for EP Application No. EP18941044.2 dated on Oct. 26, 2021.

* cited by examiner

INFORMATION PROVISION SYSTEM, INFORMATION PROVISION METHOD, AND STORAGE MEDIUM

This application is a National Stage Entry of PCT/JP2018/042998 filed on Nov. 21, 2018, the contents of all of which are incorporated herein by reference, in their entirety.

TECHNICAL FIELD

The present disclosure relates to authentication, and in particular, to a technique for controlling provision of information regarding an authentication result to an authenticated person.

BACKGROUND ART

There has been an increasing demand for quick authentication. For example, there is a case where authentication is performed, in facilities such as event venues, entertainment facilities, department stores, or companies, to confirm that a person who is likely to pass through an entrance has a right to enter the facility, to specify the identity or qualification of the person, or the like. In such a case, a large number of persons are authenticated. Therefore, for smooth flow of the persons, it is desirable that a person to be authenticated (hereinafter, also referred to as authentication target) is authenticated without stopping.

PTL 1 describes a face verification system that can smoothly perform face verification in a short time.

PTL 2 describes an iris authentication system with which iris authentication can be performed on an authentication target while walking. In this iris authentication system, when the authentication target moves to a result notification area, a light emitting diode (LED) notifies the authentication target of the authentication result.

CITATION LIST

Patent Literature

[PTL 1] WO 2017/146160 A
[PTL 2] WO 2009/016846 A

SUMMARY OF INVENTION

Technical Problem

In environment in which a large number of authentication targets exist, and in addition, in a case where the authentication targets do not stop, it is difficult to surely provide information regarding the authentication result to the authentication target. For example, in a case where an authentication system provides the authentication result by display of a display fixed to a certain authentication target or audio from a fixed speaker, there may be a situation where the authentication target does not clearly notice that the display or the audio is shown or emitted to the authentication target. There is a possibility that a person around the authentication target wrongly recognize that the display or the audio is shown or emitted to the person.

In the face verification system described in PTL 1, because a collation result is reflected to control of a gate, the authentication target may recognize the collation result from the state of the gate. However, in such a system, for conviction of the authentication target such that the collation result indicated by the state of the gate is shown to the authentication target, a premise is needed that only the authentication target is set as a collation target. That is, it is necessary to perform verification and feedback for each individual in order. Therefore, a time required from a time when a ticket is handed to the control of the gate is a time period in which walking is restricted for the authentication target or a next authentication target behind the authentication target. Even if this time is shortened according to the invention in PTL 1, the time is not zero. Therefore, a stagnation of a flow of persons may occur.

In the iris authentication system described in PTL 2, although the result is notified in the result notification area, a configuration is not described that associates authentication results for a large number of authentication targets with an authentication result to be notified to a person who enters the result notification area. Therefore, in a case where the plurality of authentication targets exists, it is not certain that the iris authentication system can correctly notify the authentication target of the authentication result. For conviction of the authentication target such that the collation result indicated in the result notification area is shown to the authentication target, it is necessary that only one authentication target exists in the result notification area. In a case of congestion, it is necessary to narrow the result notification area or control access to the result notification area, and as a result, this may cause a non-smooth flow of persons. In a case where content of the notification is content that requires time to be understood, there is a possibility that the authentication target stops.

One of an object of the disclosure is to provide a system, a method, or the like that contributes to more reliably and smoothly provide information regarding an authentication result to an authenticated person.

Solution to Problem

An information provision system according to one aspect of the disclosure includes authentication unit that authenticates an authentication target using an image obtained by imaging the authentication target to be authenticated, determination unit that determines a transmission destination of information regarding a result of the authentication to notify the authentication target of the result of the authentication according to information regarding the authentication target or a situation of the authentication target, and transmission unit that transmits the information to the determined transmission destination.

An information provision method according to one aspect of the disclosure includes authenticating an authentication target using an image obtained by imaging the authentication target to be authenticated, determining a transmission destination of information regarding a result of the authentication to notify the authentication target of the result of the authentication according to information regarding the authentication target or a situation of the authentication target, and transmitting the information to the determined transmission destination.

A storage medium according to one aspect of the disclosure stores a program for causing a computer to execute processing including authentication processing for authenticating an authentication target using an image obtained by imaging the authentication target to be authenticated, determination processing for determining a transmission destination of information regarding a result of the authentication to notify the authentication target of the result of the authentication according to information regarding the authentication target or a situation of the authentication target, and transmission processing for transmitting the information to the determined transmission destination.

Advantageous Effects of Invention

According to the disclosure, provision of information regarding an authentication result to an authenticated person can be more reliably and smoothly performed.

EXAMPLE EMBODIMENT

Hereinafter, example embodiments of the disclosure will be described in detail with reference to the drawings.

First, an outline of an example embodiment of the disclosure will be described.

<Configuration>

Figure 1:
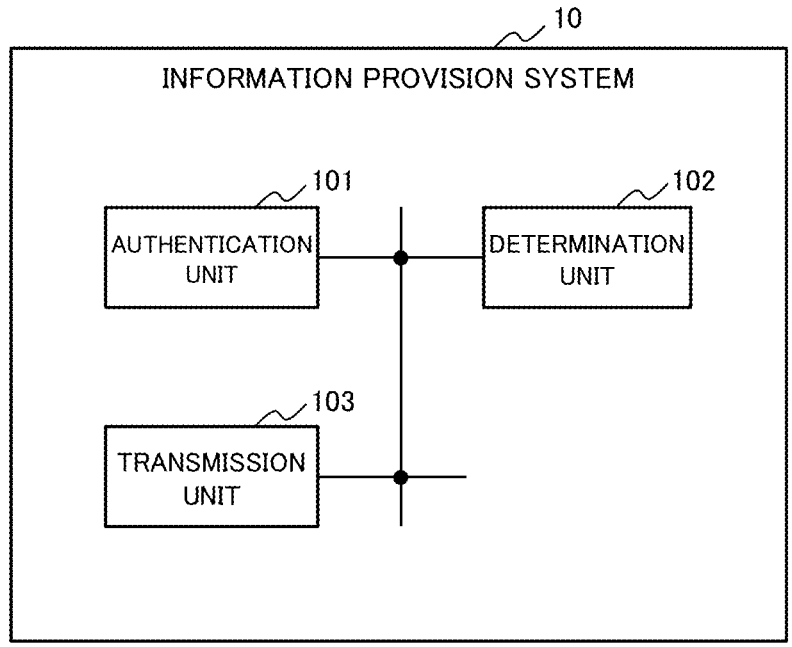
FIG. 1 is a block diagram illustrating a configuration of an information provision system according to an example embodiment of the disclosure.

FIG. 1 is a block diagram illustrating a configuration of an information provision system 10 according to one example embodiment of the disclosure. The information provision system 10 includes an authentication unit 101, a determination unit 102, and a transmission unit 103. The information provision system 10 may be implemented as a single device or may be implemented as a combination of a plurality of devices.

The authentication unit 101 authenticates an authentication target using an image of the authentication target to be authenticated.

The determination unit 102 determines a transmission destination of information regarding a result of the authentication by the authentication unit 101 according to information regarding the authentication target or a situation of the authentication target. This information is information used to notify the authentication target of the result of the authentication by the authentication unit 101.

The transmission unit 103 transmits the information regarding the result of the authentication to the transmission destination determined by the determination unit 102.

<Operation>

Figure 2:
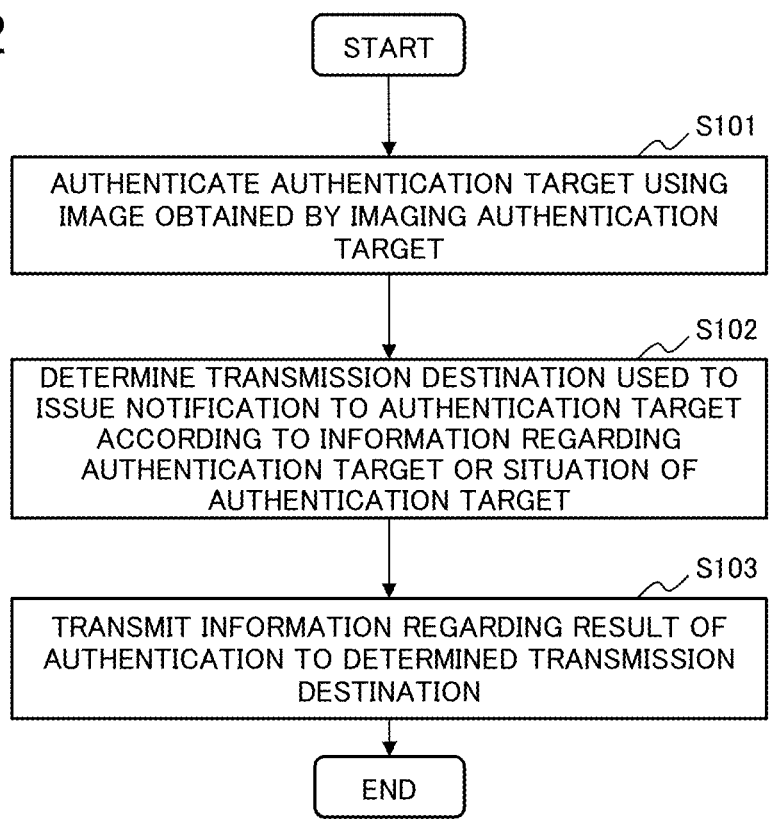
FIG. 2 is a flowchart illustrating a flow of processing of an information provision method according to the example embodiment of the disclosure.

A flow of processing by the information provision system 10 will be described with reference to the flowchart in FIG. 2.

First, the authentication unit 101 authenticates an authentication target using an image obtained by imaging the authentication target to be authenticated (step S101).

Next, the determination unit 102 determines a transmission destination used to issue a notification to the authentication target according to information regarding the authentication target or a situation of the authentication target (step S102).

Then, the transmission unit 103 transmits the information regarding the result of the authentication to the transmission destination determined by the determination unit 102 (step S103).

Effect

According to the information provision system 10, provision of the information regarding the authentication result to the authentication target can be more reliably and smoothly performed. This is because the determination unit 102 determines the transmission destination according to the information regarding the authentication target or the situation of the authentication target and the transmission unit 103 transmits the information regarding the result of the authentication to the transmission destination.

Application Example

Next, an example of a scene to which the disclosure is applied will be described below.

One example is an entrance area of a building where an office of a company is located. In this building, it is assumed that a large number of employees pass through this entrance area to go to the office. A person who passes through the entrance area is an authentication target. An object of the authentication is, for example, to specify who the person is and confirm whether the person to be authenticated is a person who is permitted to enter the building, to record a time when the person passing through the entrance area in association with information regarding the person, or the like.

Another example is an entrance area for people who are involved in a competition (players, volunteers, or the like) in a facility where the competition is held. A person who passes through the entrance area is an authentication target.

In the present disclosure, it is assumed to use features that can be acquired from a person who is walking for authentication. Examples of such features include a face, a figure (clothes, body shape, or the like), a gait, a palm shape, an auricle, an iris, or the like of a person. Features that can be acquired from a person who is walking other than the examples described above may be used for authentication.

In the following, it is assumed that all passers who pass through the entrance area be authenticated. However, there may be an example embodiment in which some passengers are not authenticated. In the present disclosure, the person to be authenticated is referred to as an "authentication target". However, in the description at a stage when an authentication target is not specified as an authentication target, a person who may be an authentication target may be referred to as a "passenger".

The disclosure may be applied to the authentication performed in the scene described above. Hereinafter, an outline of an information processing system 100 to which the disclosure is applied will be described.

Figure 3:
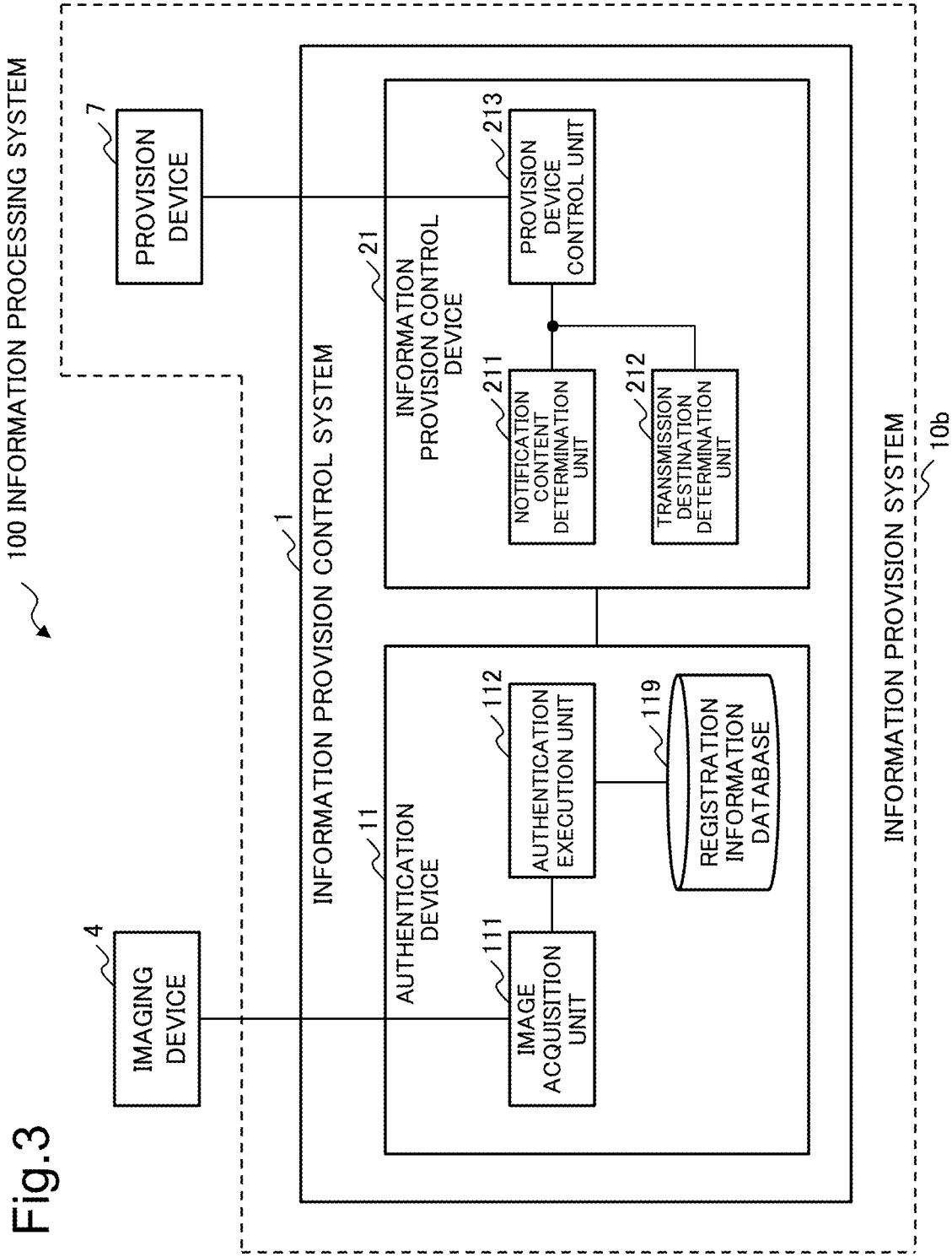
FIG. 3 is a block diagram illustrating an example of a functional configuration of an information processing system to which the disclosure is applied.

FIG. 3 is a block diagram illustrating a main functional configuration of the information processing system 100. The information processing system 100 includes an imaging device 4, an information provision control system 1, and a provision device 7. In the information processing system 100, a pair of the information provision control system 1 and the provision device 7 is referred to as an information provision system 10b in the present disclosure. The information provision system 10b is related to an example of the information provision system 10.

==Imaging Device 4==

The imaging device 4 images a direction where the imaging device 4 faces so as to generate an image. The image generated by imaging of the imaging device 4 may be a still image or a moving image. The image may be a color image or a grayscale image. Hereinafter, the image acquired by imaging of the imaging device 4 is also referred to as a captured image.

Figure 4:
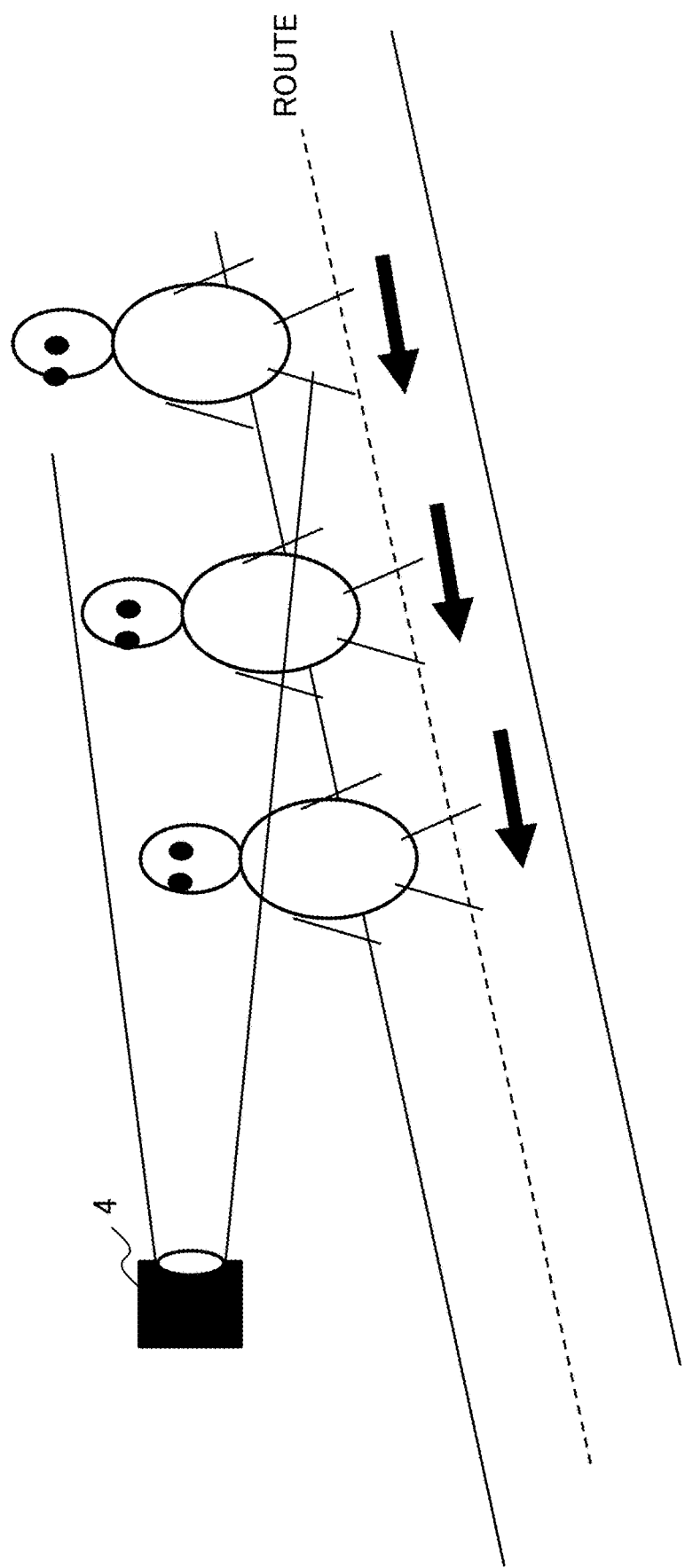
FIG. 4 is a diagram illustrating an example of a scene to which the disclosure is applied.

FIG. 4 is a diagram illustrating an example of a mode of imaging by the imaging device 4. FIG. 4 illustrates an example in which the imaging device 4 images authentication targets who follow a route in line. An arrow indicates a traveling direction of the authentication target. In a case where a route of the authentication target is determined, by providing the imaging device 4 so as to image a space above the route (or position and direction are controlled), the authentication target can be imaged. It is sufficient that imaging conditions such as an imaging range or a depth of field be appropriately set according to a type of the features used for authentication. For example, in a case where the feature used for authentication is a feature obtained from the face, it is sufficient that the imaging conditions of the imaging device 4 be set so that the head of each authentication target is included in the imaging range. Furthermore, in a case where the feature used for authentication is an iris, it is sufficient that the imaging conditions be set so that a focus of the imaging device 4 is set within a range through which the iris of each authentication target is considered to pass. However, the imaging conditions do not need to be fixed. The imaging device 4 may be able to control the imaging conditions (manually or automatically) such as the imaging range (including position, inclination, imaging direction, angle of view, or the like), the depth of field, or the like according to the situation.

The imaging device 4 may be attached to a mechanism that changes the position, the inclination, the imaging direction, or the like of the imaging device 4. The imaging device 4 may be configured to be able to change the position, the inclination, the imaging direction, or the like of the imaging device 4.

Although the route is illustrated in FIG. 4, even in a case where the route is not determined, if the imaging range of the imaging device 4 is set so as to cover an area through which the authentication target certainly passes, it is possible to image all the authentication targets without missing.

The plurality of imaging devices 4 may be provided. The plurality of imaging devices 4 may include an imaging device 4 not for imaging the feature used for authentication. For example, an imaging device 4 that is provided to monitor a movement of a passenger may be included.

==Provision Device 7==

The provision device 7 is a device that provides notification regarding a result of authentication to an authentication target. A specific example of the provision device 7 will be described later.

==Information Provision Control System 1==

The information provision control system 1 is configured to be able to acquire a captured image from the imaging device 4. The information provision control system 1 is configured to be able to transmit information to the provision device 7. For example, the information provision control system 1 may be communicably connected to each of the imaging device 4 and the provision device 7 by a wired or wireless system.

The information provision control system 1 includes an authentication device 11 that executes processing regarding authentication and an information provision control device 21 that executes processing regarding control of the provision device 7. In the following description, the authentication device 11 and the information provision control device 21 are described as separate devices. However, the authentication device 11 and the information provision control device 21 may be implemented as a single device. Any one of components in the authentication device 11 and the information provision control device 21 may be implemented as an independent device. Connections between components may be freely designed as long as the connections do not interfere processing.

==Authentication Device 11==

The authentication device 11 includes an image acquisition unit 111, an authentication execution unit 112, and a registration information database 119.

The image acquisition unit 111 acquires a captured image in which an authentication target is imaged from the imaging device 4. By receiving the captured image from the imaging device 4 through communication, the image acquisition unit 111 acquires the captured image.

The captured image acquired by the image acquisition unit 111 is used for authentication. However, the captured image used for authentication may be selected. The imaging device 4 may select the captured image, and the authentication device 11 may select the captured image.

The registration information database 119 stores personal information of a person and information regarding features that may be extracted from an image of the person in association with each other. The personal information may include, for example, a name, a date of birth, an attribute (gender, age, official position, or the like), a unique Identifier (ID) assigned to each person.

The authentication execution unit 112 authenticates the authentication target using the captured image acquired by the image acquisition unit 111. Specifically, the authentication execution unit 112 executes, for example, a next process.

First, the authentication execution unit 112 determines a person to be an authentication target using the captured image. Specifically, it is sufficient that the authentication execution unit 112 detect the person in to the captured image and determine the detected person as an authentication target. In a case where a plurality of persons is imaged in the captured image, the authentication execution unit 112 may determine one of the persons as an authentication target, and a person detecting method may be a known method. Then, the authentication execution unit 112 extracts features from the authentication target. For example, in a case where an iris is adopted as the feature, the authentication execution unit 112 specifies positions of eyes from the detected person and extracts portions of irises included in the eyes. The authentication execution unit 112 collates the extracted feature with a feature registered in the registration information database 119 (that is, registered feature) and specifies the registered feature that is determined to match the extracted feature from among the registered features. In a case where there is a registered feature that is determined to match the extracted feature, the authentication execution unit 112 authenticates that the authentication target is a person identified by the personal information associated with the registered feature (that is, authentication target is "authenticated"). In a case where there is no registered feature that is determined to match the extracted feature, the personal information of the person included in the captured image is not specified (that is, authentication target is "not authenticated").

The authentication execution unit 112 may generate authentication result information indicating the result of the authentication. The authentication result information may be, for example, information indicating whether the authentication target is authenticated (that is, identity of the authentication target is found). In a case where the authentication target is authenticated, the authentication result information may be information that may be extracted from the registration information database 119 and that indicates the personal information of the authentication target as information regarding the authentication target.

The authentication device 11 may provide the authentication result information to the information provision control device 21.

===Information Provision Control Device 21===

The information provision control device 21 includes a notification content determination unit 211, a transmission destination determination unit 212, and a provision device control unit 213.

The notification content determination unit 211 determines content of a notification to a person to be notified. The person on which the authentication processing by the authentication device 11 is executed is the target to be notified. All the persons on which the authentication processing is executed may be the targets to be notified, and some of the persons on which the authentication processing is executed may be the targets to be notified. Hereinafter, the person who is the target to be notified is referred to as a "notification target".

The notification is an example of the information regarding the result of the authentication. The content of the notification is content regarding the result of the authentication on the notification target by the authentication device 11. For example, the notification may be information indicating whether the notification target is authenticated. The notification may be information indicating a guidance or an instruction to the notification target. For example, the notification content determination unit 211 may determine content that urges the authenticated notification target to proceed as the content of the notification and may determine content that instructs a target who is not authenticated to move to a predetermined area as the content of the notification. In this way, the notification content determination unit 211 may determine the content including the instruction or the guidance that differs according to whether the notification target is authenticated as the content of the notification. Regarding the notification to the notification target who is not authenticated, the notification content determination unit 211 may determine whether to reauthenticate the notification target, and then, determine the content of the notification on the basis of the determination.

The transmission destination determination unit 212 determines a transmission destination of the information used for the notification to the notification target. The transmission destination indicates an object, a person, a point, a space, or the like which the information reaches. Although a specific example of the transmission destination is indicated in description of a specific example embodiment to be described later, various objects may be "transmission destinations" according to the example embodiment. For example, a space including the head of the notification target or the provision device 7 may be a "transmission destination".

The provision device control unit 213 controls the provision device 7 that issues a notification to the notification target. A specific example of the content depends on the example embodiment. However, the content that may be controlled by the provision device control unit 213 is, for example, operation or non-operation, a position, a direction, a timing, output content, or the like. The provision device control unit 213 controls the provision device 7 on the basis of information regarding at least the content of the notification determined by the notification content determination unit 211 and the transmission destination determined by the transmission destination determination unit 212. By the control by the provision device control unit 213, the notification target recognizes the notification regarding the result of the authentication from the provision device 7.

Hereinafter, the information that is sent by the provision device control unit 213 to the provision device 7 and is used to control the provision device 7 is also referred to as "control information". The control information is an example of the information regarding the result of the authentication.

Specific Example Embodiment

The disclosure can be implemented in various modes. Hereinafter, some specific example embodiments of the disclosure will be exemplified.

Provision of Control According to Situation of Notification Target

The provision device control unit 213 may perform control according to the situation of the notification target.

Examples of the situation of the notification target that affects the content of the control includes a position, a posture, a line-of-sight direction, or the like of the notification target.

Figure 5:
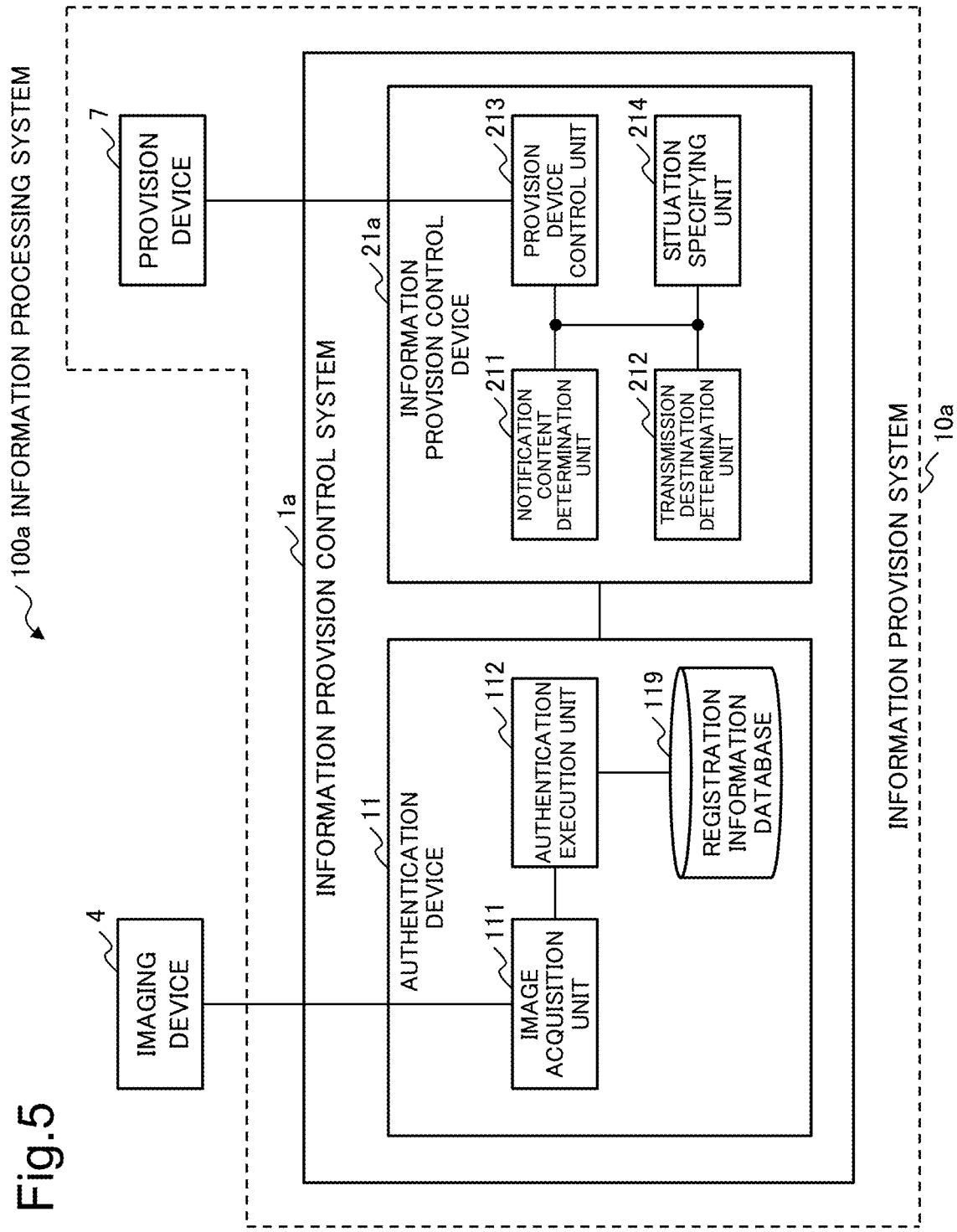
FIG. 5 is a block diagram illustrating an example of a functional configuration of an information processing system in a case where an information provision control device includes a situation specifying unit.

After specifying the situation of the notification target, the information provision control device 21 may determine the content of the control to the provision device 7 on the basis of the situation. Hereinafter, a function unit that specifies the situation of the notification target is described as a situation specifying unit 214. The configuration of the information processing system 100 in a case where the information provision control device 21 includes the situation specifying unit 214 is illustrated in FIG. 5 as an information processing system 100a. Hereinafter, a reference numeral "21a" is assigned to an information provision control device that includes the situation specifying unit 214. A reference numeral "1a" is assigned to an information provision control system that includes the information provision control device 21a, and a reference numeral "10a" is assigned to an information provision system that includes the information provision control system 1a.

The situation specifying unit 214 may specify the situation of the notification target, for example, from the captured image. The situation specifying unit 214 may acquire the captured image in which the notification target is imaged from the authentication device 11 and specify the situation of the notification target from the captured image. The situation specifying unit 214 may also acquire information that indicates a position of the notification target in the captured image from the authentication device 11.

An example will be described in which an actual position (actual position) of the notification target is specified as the situation of the notification target. The actual position indicates a position in a real space (real space). The situation specifying unit 214 may calculate the actual position of the notification target, for example, using the position of the notification target in the captured image and the imaging range of the imaging device 4. In a case where the imaging range of the imaging device 4 is determined and is invariable, it is sufficient that information regarding the imaging range of the imaging device 4 be input to the information provision control device 21a in advance. In a case where the imaging range of the imaging device 4 is variable, it is sufficient that the information provision control device 21a recognize the information regarding the imaging range of the imaging device 4 periodically or as needed. For example, in a case where it is determined to execute the processing by the situation specifying unit 214, it is sufficient that the information provision control device 21a acquire information such as a position, an optical axis direction, an inclination, an angle of view, or the like of the imaging device 4 from the imaging device 4 (in a case where mechanism that changes position, inclination, imaging direction, or the like of imaging device 4 is provided outside imaging device 4, from the mechanism) and calculate the imaging range of the imaging device 4 on the basis of the acquired information. In the example embodiment in which the information provision control system 1a sends range control information that specifies the imaging range of the imaging device 4 and the imaging device 4 changes the imaging range on the basis of the instruction, the information provision control device 21a may acquire the information regarding the imaging range from the range control information.

The situation specifying unit 214 may specify the posture and/or the line-of-sight direction of the notification target using a recognition technique. The recognition technique for specifying the posture and/or the line-of-sight direction is well known.

Hereinafter, an example of specific content of the control according to the situation of the notification target will be described.

Control of Output Range by Output Device that can Change Output Range

The provision device 7 may be an output device that can change an output range. Then, the provision device control unit 213 may control the output range of the provision device 7. In the present disclosure, a word "output range" is used as not only meaning of a range that is affected by an output physical action but also meaning of a range that is largely affected by the output physical action. In short, the output device that can change the output range is an output device of which the effect of the output physical action (may include information amount and quality of information) significantly differs depending on the position and the difference can be changed.

First Specific Example

For example, the provision device 7 may be a display. A display screen of the display may be different in visibility or is not visible from a certain position depending on a difference in a direction to the notification target or a position where information is displayed. If the display is configured to be able to change at least one of a direction and a position of the display, it can be said that the display is one of the output devices that can change the output range. The provision device control unit 213 may control at least one of the position and the direction of the display.

In such a specific example, the transmission destination determined by the transmission destination determination unit 212 is, for example, a point where the eye of the notification target is located in the real space. A relatively wider range such as the "head", not the eyes, may be determined as the transmission destination. The transmission destination determination unit 212 determines the position, specified by the situation specifying unit 214, where the eye of the notification target is located (for example, expressed by coordinates or the like) as a transmission destination. It is sufficient that the provision device control unit 213 control the direction of the display so that a normal direction of display on the display is directed to the transmission destination. The provision device control unit 213 may control the position of the display so that the normal direction of the display of the display is directed to the transmission destination instead of or together with the control of the direction of the display. During the control, a field of view of the notification target may be considered. The provision device control unit 213 may control the position of the display to be included in the field of view of the notification target.

The provision device 7 may be configured to have a stronger directivity. For example, a structure that prevents visibility of the display screen from a certain direction may be provided around the display screen. On the display screen, a filter that prevents visibility from a certain direction may be attached. The display may be a display having a feature such that a range where a display is easily viewed is narrow, such as a liquid crystal display of a Twisted Nematic (TN) method or a Vertical Alignment (VA) method or the like.

To perform control by the provision device control unit 213, in a case where the provision device 7 has a function for changing the position and/or the direction, it is sufficient that information indicating a desired position and/or direction of the provision device 7 be included in the control information. In a case where the provision device 7 can be moved by a mechanism, different from the provision device 7, that changes the position and/or the direction of the provision device 7, it is sufficient that the provision device control unit 213 send a control instruction in which the desired position and/or direction of the provision device 7 are specified to the mechanism.

In a case where a display that has a plurality of displayable regions is used as the provision device 7, it is sufficient for the provision device control unit 213 to control a position on the display where the notification is displayed so that the normal direction of the display is directed to the transmission destination. In this case, it is sufficient that the provision device control unit 213 include a display position and display content in the control information.

Figure 6:
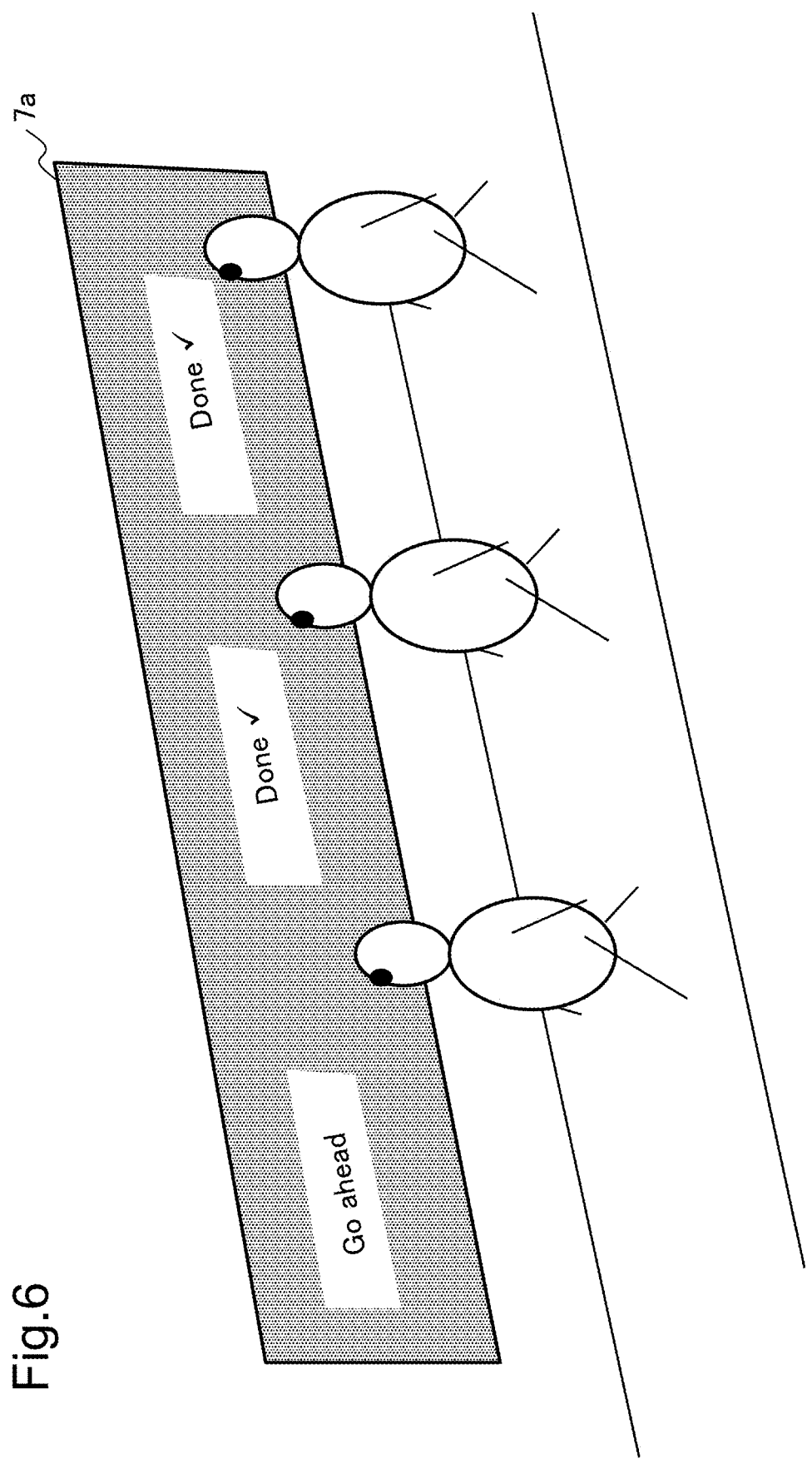
FIG. 6 is a diagram illustrating an example of a situation in which an information provision method using a display that has a plurality of displayable regions is performed.
Figure 13:
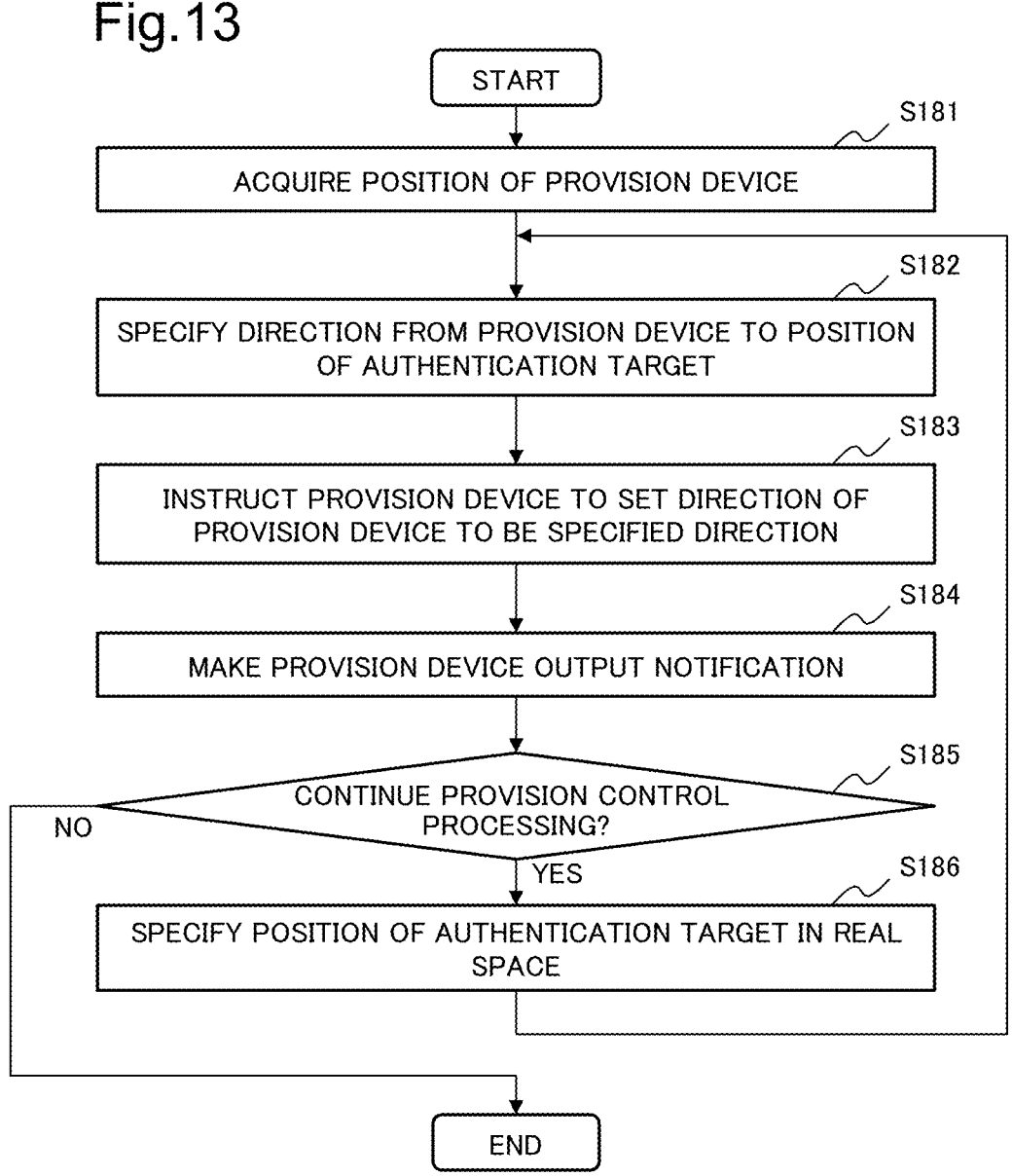
FIG. 13 is a flowchart illustrating a first specific example of provision control processing in the first operation example.

An example of an example embodiment in which the display that has the plurality of displayable regions is used as the provision device 7 is illustrated in FIG. 6. As illustrated in FIG. 6, the provision device control unit 213 may display notifications to multiple notification targets on a single display 7a. The provision device control unit 213 may sequentially change the region where the notification is displayed according to a movement of the notification target (refer to "first example of control processing" to be describe later and FIG. 13). When the region of the display changes according to the movement of the notification target, even if content needs time to be understood, the notification target can confirm the notification while moving. Therefore, occurrence of a stagnation of a flow of persons can be prevented.

In such an example embodiment, as illustrated in FIG. 6, a sentence or an image indicating whether the notification target is authenticated and/or a sentence or an image indicating an instruction to the notification target may be included. It is sufficient that the provision device control unit 213 include the content of the notification determined by the notification content determination unit 211 in the control information.

Second Specific Example

For example, the provision device 7 may be a directional speaker. It is sufficient for the provision device control unit 213 to control an output direction of the directional speaker so that the head of the notification target is included a range where the notification target can listen to sound emitted from the directional speaker. To control the output direction of the directional speaker, it is sufficient for the provision device control unit 213 to control at least one of a position and a direction of the directional speaker. In this case, the transmission destination determined by the transmission destination determination unit 212 is a region including the head of the notification target in the real space.

Examples of the directional speaker include a speaker having a structure like a megaphone, an array-type speaker, a parametric speaker, or the like.

In such a specific example, content of a notification may be sentence-reading voice or sound effects. An authentication result can be directly or indirectly expressed. For example, the provision device 7 is configured to be able to output first sound effect indicating that the notification target is authenticated (for example, sound "ding-dong") and second sound effect indicating that the notification target is not authenticated (for example, sound "bee bee"), and it is sufficient that the provision device control unit 213 include information indicating which sound effect is output in the control information. Alternatively, the provision device 7 is configured to be able to receive audio information (may be analog signal, digital signal, or data generated by converting digital signal) from the provision device control unit 213 and output the audio information, and it is sufficient that the provision device control unit 213 include the audio information in the control information.

It is sufficient that the provision device control unit 213 include the content of the notification determined by the notification content determination unit 211 in the control information. Alternatively, the provision device control unit 213 may generate a signal that specifies content output from the provision device 7 on the basis of the content of the notification determined by the notification content determination unit 211.

Third Specific Example

For example, the provision device 7 may be a spotlight that irradiates the notification target. The transmission destination determination unit 212 may determine a point in the route where the notification target is positioned as a transmission destination. Then, it is sufficient for the provision device control unit 213 to control a position and/or a direction of the spotlight so as to irradiate the transmission destination with light of the spotlight.

The transmission destination determination unit 212 may determine a region away from the ground (for example, region including head of notification target) as a transmission destination.

In this specific example, the content of the notification regarding the authentication result may be expressed, for example, by features of the light of the spotlight. For example, the provision device control unit 213 may be configured so that the transmission destination is irradiated with green spotlight in a case where the notification target is authenticated and the transmission destination is irradiated with red spotlight in a case where the notification target is not authenticated. It is sufficient for the provision device 7 to be configured so that the provision device control unit 213 can control the feature of the light emitted by the provision device 7. The content of the notification regarding the authentication result may be identified according to blinking, an irradiation position, a movement, or the like of light, in addition to the difference in color described above.

Fourth Specific Example

For example, the provision device 7 may be a projector. It is sufficient for the provision device control unit 213 to control a position and/or a direction of the projector so that a video projected by the projector is displayed at the transmission destination. If the provision device 7 is a projector can change a projection direction by itself, it is sufficient for the provision device control unit 213 to control the projection direction by instructing the projection direction to the provision device 7. The provision device control unit 213 may control only the position of the projector. The transmission destination determination unit 212 may determine, for example, a screen that is close to the notification target or that may enter the field of view of the notification target as a transmission destination. The screen may be any structure as long as the screen may serve as a screen and may include walls or floors.

Figure 7:
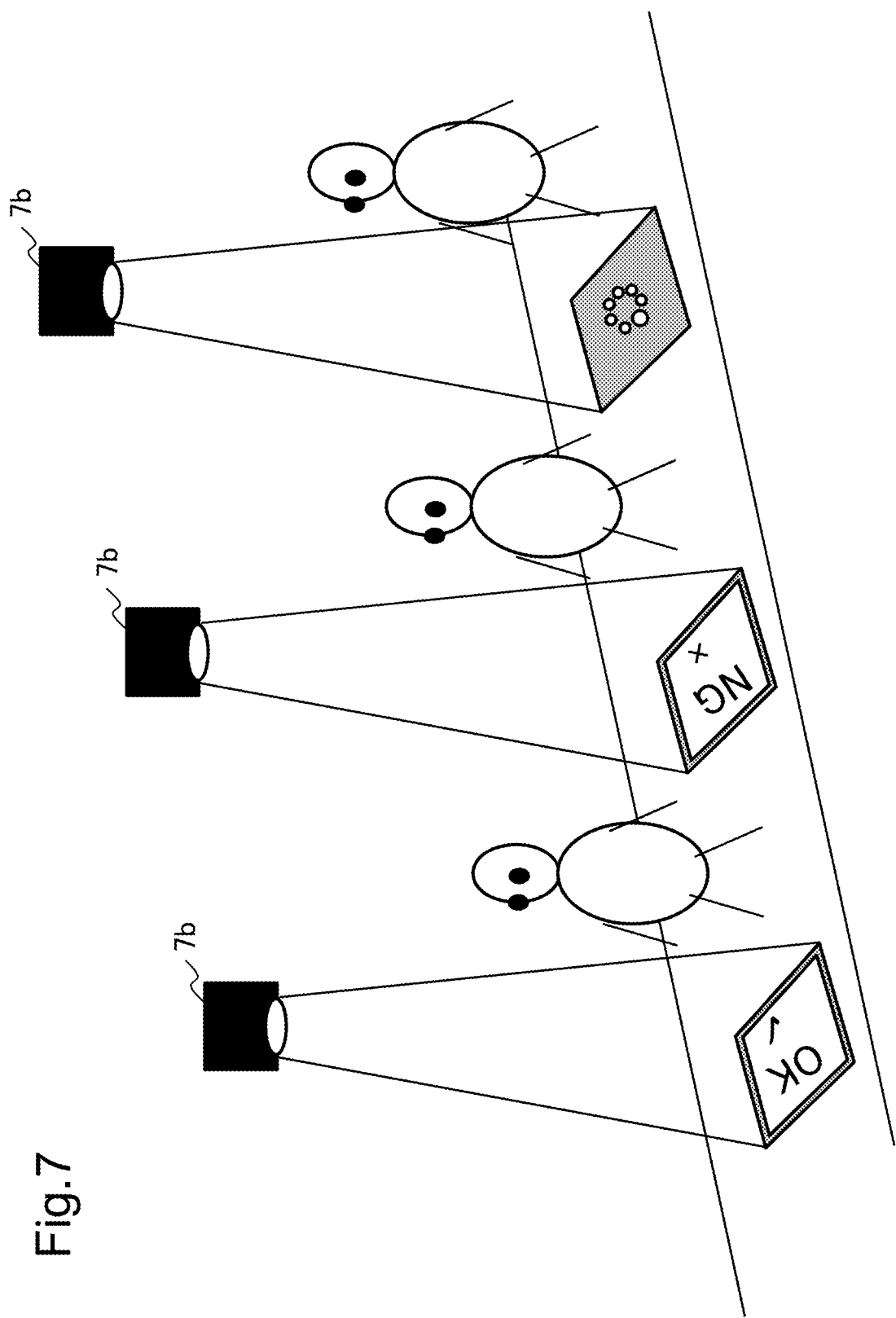
FIG. 7 is a diagram illustrating an example of a situation in which an information provision method using a projector is performed.

FIG. 7 is a diagram illustrating an example embodiment in a case where a projector is adopted as the provision device 7. For example, as illustrated in FIG. 7, the provision device control unit 213 controls a position and/or a direction of a projector 7b so that a video indicating an authentication result is projected in a region on a traveling direction side under the notification target's feet by the projector 7b. The provision device control unit 213 may include information regarding the projected video in control information. The provision device control unit 213 may control the plurality of projectors 7b so that each projector concurrently notifies each of the plurality of notification targets of an authentication result. A video displayed at the rightmost in FIG. 7 is a video indicating that the authentication result does not appear yet.

In a case where the provision device 7 is a projector that can project a video in a range wider than the transmission destination at one time, the provision device control unit 213 may control an output video of the provision device 7 so that a notification is displayed only in a region relating to the transmission destination in a range in which the video can be projected at one time.

Fifth Specific Example

For example, the provision device 7 may be a laser pointer. The transmission destination determination unit 212 may determine, for example, an object that is close to the notification target or that may enter the field of view of the notification target as a transmission destination. It is sufficient for the provision device control unit 213 to control a position and/or a direction of the laser pointer so as to irradiate the transmission destination with light from the laser pointer.

In this specific example, content of a notification regarding the authentication result may be expressed, for example, by features of the light of the laser pointer. For example, it is sufficient that the provision device control unit 213 be configured so that the laser pointer emits green light to the transmission destination in a case where the notification target is authenticated and the laser pointer emits red light to the transmission destination in a case where the notification target is not authenticated. The content of the notification regarding the authentication result may be identified according to blinking, an irradiation position, a movement, or the like of the light, in addition to the difference in color as described above. For example, the provision device control unit 213 may control a movement of the laser pointer so that the light draws characters, figures, or the like.

In a case where the laser pointer is adopted, a color of laser light cannot be visually recognized on an optical path, and a feature of the light can be transmitted to only a person who can visually recognize an irradiation destination. Therefore, when a place that can be visually recognized by only the notification target is set as an irradiation destination, it is possible to prevent the authentication result from being known by a person other than the notification target. The place that can be visually recognized by only the notification target is, for example, the abdomen of the notification target.
[Note]

The above examples are specific examples. If a physical action other than those described above is a physical action that can be perceived by the notification target, the physical action may be provided to the notification target by the provision device 7. Regardless of what is provided, the transmission destination determination unit 212 determines a provision range of those provided, and it is sufficient for the provision device control unit 213 to control the provision device 7 so as to provide those to be provided to the determined range.

Sixth Specific Example

In a case where there is a premise that the notification target holds a device that has a function for issuing a notification when receiving electromagnetic waves representing a notification instruction, the provision device 7 may be a device that emits the electromagnetic waves with a directivity. It is sufficient that the transmission destination determination unit 212 determine a position of the notification target as a provision destination. Then, it is sufficient for the provision device control unit 213 to control the provision device 7 so that the provision device 7 emits electromagnetic waves representing a notification instruction to the provision destination. The notification instruction is an instruction to issue a notification. What kind of electromagnetic waves indicates a notification instruction may be determined in advance. For example, the electromagnetic waves representing the notification instruction may be electromagnetic waves in a predetermined band.

It is sufficient that a device that has a function for issuing a notification when receiving the electromagnetic waves representing the notification instruction in this specific example be distributed to a passenger in advance at a stage before the passenger passes through the entrance area. As a mode of the notification by the device, for example, it is sufficient that at least one of light, sound, and vibration be adopted. For example, when receiving the electromagnetic waves representing the notification instruction, the device may output audio "authenticated" while being vibrated. When receiving another type of electromagnetic waves, the device may further output audio "not authenticated" while being vibrated.

Notification Instruction to One of Plurality of Output Devices

The plurality of provision devices 7 may be provided along the route through which the notification target passes. Then, the provision device control unit 213 may achieve information provision to the notification target by activating any one of the plurality of provision devices 7. In such an example embodiment, the transmission destination determination unit 212 determines any one of the plurality of provision devices 7 as a "transmission destination".

It is sufficient that each of the plurality of provision devices 7 be configured to be able to wiredly or wirelessly receive the control information from the information provision control device 21a. It is sufficient that the information provision control device 21a be configured to be able to selectively transmit the control information including an instruction to issue a notification to one of the plurality of provision devices 7. A method for selectively transmitting the control information to a specific provision device 7 by the information provision control device 21a includes a method performed by specifying an address, a method for controlling a path of a signal, a method for emitting radio waves in a target direction by a mechanism that emits radio wave with a directivity, or the like.

Seventh Specific Example

For example, a plurality of displays may be provided along the route as the provision device 7. The provision device control unit 213 may determine a display that is the most visible for the notification target as a transmission destination and display a notification on the display. The display that is the most visible for the notification target is, for example, a display that is included in the field of view of the notification target and has a short distance with the notification target. Based on such an idea, it is sufficient that the provision device control unit 213 be configured to specify the display that is the most visible for the notification target on the basis of the distance of each display to the notification target, an angle formed with a traveling direction of the notification target, or the like.

The provision device control unit 213 may determine a display existing ahead of the line of sight of the notification target as a transmission destination on the basis of the line-of-sight direction of the notification target.

Eighth Specific Example

The plurality of provision devices 7 provided along the route may be a simple illumination. The notification target can recognize content of a notification to the notification target, for example, by light of illumination closest to the notification target.

Ninth Specific Example

The plurality of provision devices 7 provided along the route may be a speaker. Although each speaker may be a speaker that has a directivity or does not have a directivity, it is sufficient that the respective speakers be provided so that ranges where sounds from the respective speakers do not overlap. It is sufficient that the transmission destination determination unit 212 determine the provision device 7 with which the notification target can listen to sound emitted by the provision device 7 as a transmission destination.

Figure 8:
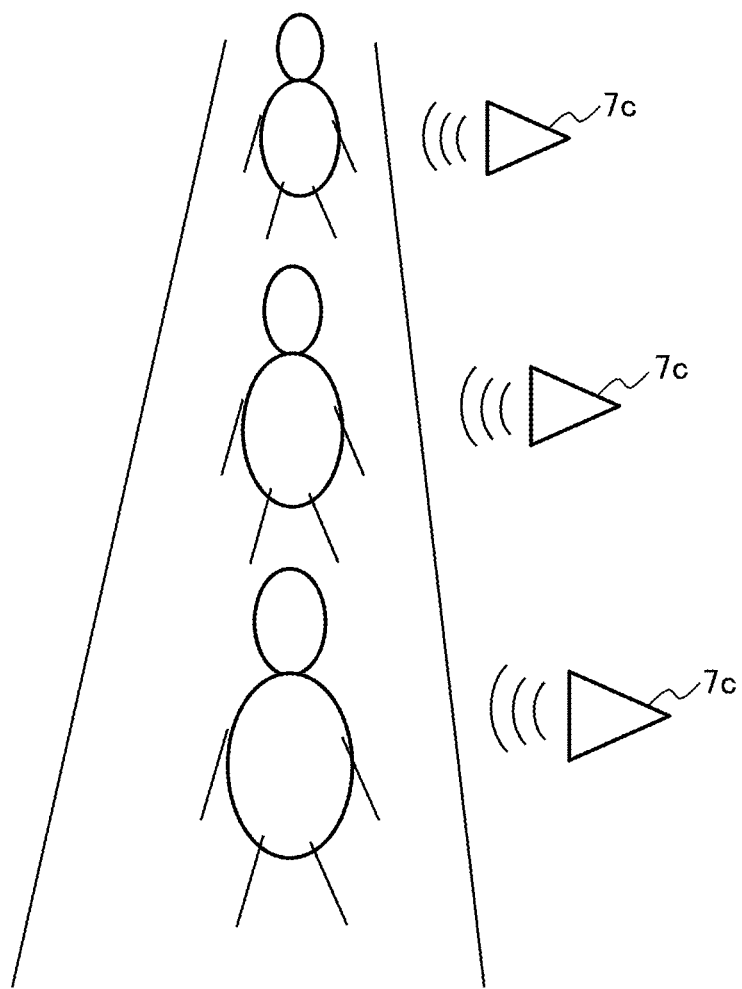
FIG. 8 is a diagram illustrating an example of a situation in which an information provision method using a plurality of speakers is performed.

FIG. 8 is a diagram illustrating an example embodiment in which a notification is provided using the plurality of speakers. The provision device control unit 213 instructs a speaker 7c that includes the head of the notification target in an audible range to output a notification. The provision device control unit 213 may instruct a timing when the speaker 7c emits sound.

The content of the notification may be distributed to the plurality of speakers. That is, the provision device control unit 213 may control the plurality of speakers so that the plurality of speakers sequentially emits a part of notification.

Tenth Specific Example

The provision device 7 may be a device that emits electromagnetic waves representing the notification instruction to a predetermined range. A plurality of such provision devices 7 may be provided along the route. In such a specific example, it is assumed that the authentication target be requested to hold a device that issues a notification when receiving the electromagnetic waves representing the notification instruction. It is sufficient that the transmission destination determination unit 212 determine the provision device 7 that includes the position of the notification target in the output range as a provision destination. Then, it is sufficient for the provision device control unit 213 to instruct the provision device 7 determined by the transmission destination determination unit 212 to emit the electromagnetic waves representing the notification instruction.

[Note]

In the seventh to the tenth specific examples, each of the plurality of provision devices 7 may be able to control the output range. The transmission destination determination unit 212 may not only determine the single provision device 7 from among the plurality of provision devices 7 and further determine a range to which the determined provision device 7 outputs a notification. For example, the provision device control unit 213 may control at least one of a direction or a position of the provision device 7 determined as a transmission destination.

Eleventh Specific Example

The provision device 7 may be a device that makes an object touched by the notification target vibrate. For example, it is assumed that the authentication target be requested to walk while touching a railing provided along the route. In this case, the provision device 7 may be a device that can selectively vibrate a plurality of positions of the railing. The transmission destination determination unit 212 may determine which part of the railing is vibrated on the basis of the position of the notification target. Then, the provision device control unit 213 may control the provision device 7 so as to vibrate the part determined by the transmission destination determination unit 212. In this case, one of the plurality of parts that may vibrate is related to the "transmission destination" to be determined.

In a case of this specific example, the content of the notification can be subdivided according to a pattern, intensity, or the like of the vibration.

In addition to the railing, a floor, a wall, or the like may be adopted as an object to be vibrated.

Control of Provision Using Information Regarding Device Held by Notification Target The provision device control unit 213 may control provision of a notification using information regarding a device that is held by the notification target and has a communication function and a function for issuing a notification (hereinafter, "notification device"). Specifically, the provision device control unit 213 may instruct the notification device held by the notification target to issue a notification. In this case, the notification device held by the notification target is the provision device 7 and is related to the "transmission destination". To determine the transmission destination is to specify device information of the notification device held by the notification target from among a plurality of notification devices owned by a plurality of authentication targets.

The device information of the device is information for specifying the device. For example, the device information is a mail address, a phone number, an ID, or the like assigned to the device.

Twelfth Specific Example

An example of the notification device is a device, such as a mobile phone, owned by the notification target. The transmission destination determination unit 212 may specify the device information of the notification device owned by the notification target on the basis of information for identifying the notification target.

For example, each authentication target is requested to hold a mobile phone owned by the authentication target in advance. The information provision control system 1 holds possession information in which the information for identifying the authentication target and the device information of the mobile phone to be owned by the authentication target are associated with each other. It is sufficient that the possession information be stored in, for example, a storage device included in the authentication device 11 or a storage device included in the information provision control device 21.

Because information for identifying a notification target who has been authenticated is found through authentication by the authentication device 11, the transmission destination determination unit 212 may extract device information associated with the information from the possession information. Then, the transmission destination determination unit 212 determines a mobile phone indicated by the extracted device information as a transmission destination. The provision device control unit 213 generates control information including an instruction to the mobile phone indicated by the device information (this is related to transmission destination) on the basis of the device information and transmits the control information to the transmission destination. The mobile phone that is the transmission destination receives the control information and issues a notification to the notification target on the basis of the instruction indicated by the control information. A mode of the notification is, for example, display of a mail or a short message, or the like. Notification of incoming calls (may include at least one of vibration, light emission, and ringtone) may be used as the notification regarding the authentication result.

[Modifications]

Personal information of the notification target may be specified by a method other than the authentication by the authentication device 11. For example, assuming that the authentication target hold an Integrated Circuit Card (IC card), the information provision control system 1 may specify the personal information of the notification target by reading information from the IC card held by the authentication target. It is assumed that personal information of a person who holds the IC card be recorded in the IC card. If the information provision control system 1 performs authentication after specifying a position in a captured image of the authentication target who holds the IC card from which the personal information is read, the information provision control system 1 can associate the authenticated notification target with the information of the person specified by the IC card held by the notification target.

Figure 9:
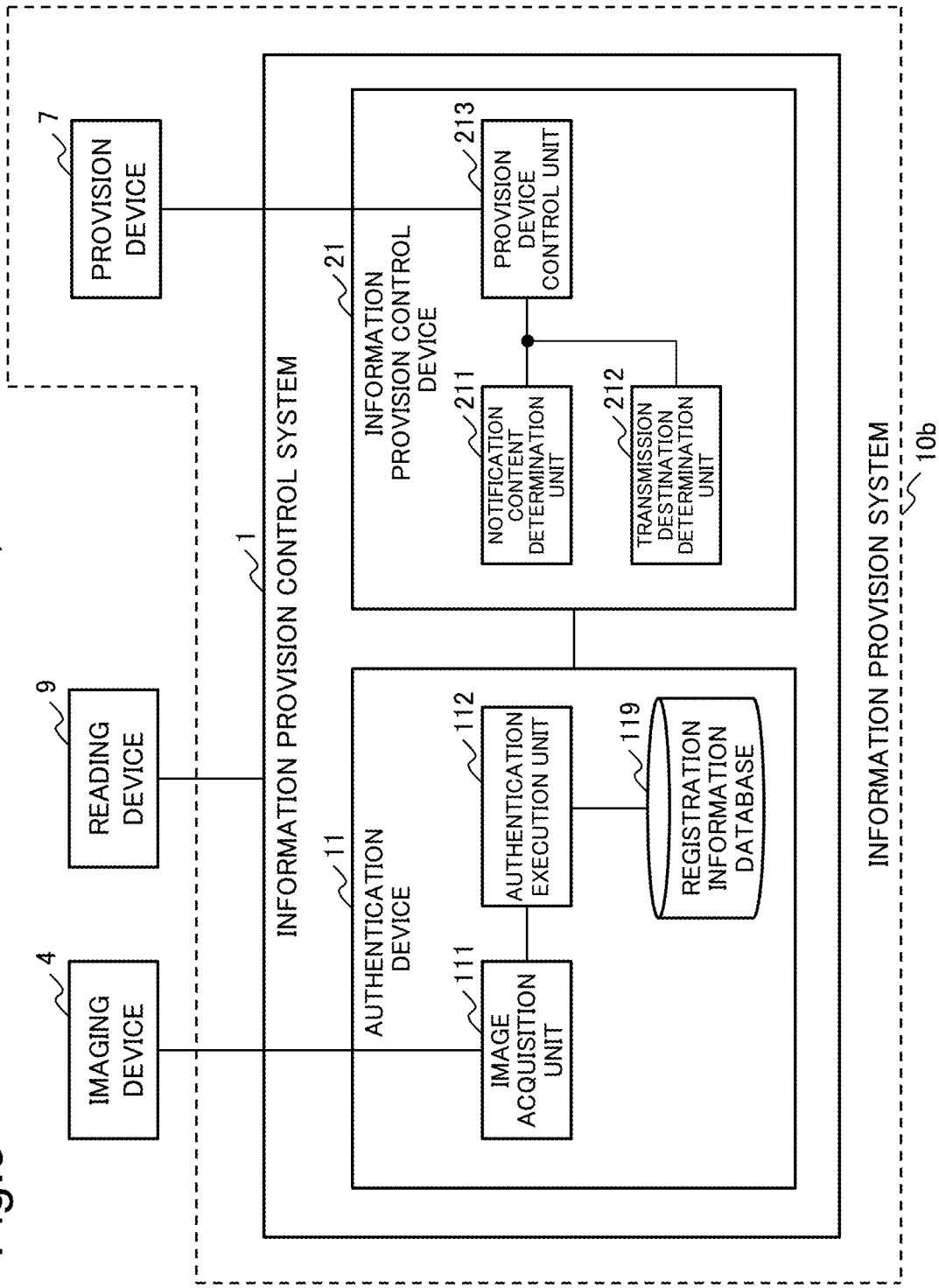
FIG. 9 is a block diagram illustrating an example of a functional configuration of an information processing system that includes a reading device.

A device that reads the information recorded in the IC card is referred to as a reading device. An example of a functional configuration of an information processing system 100b including a reading device 9 is illustrated in FIG. 9. It is sufficient that the information provision control system 1 be configured to be able to receive information from the reading device 9. For example, it is sufficient that the information provision control system 1 and the reading device 9 be communicably connected to each other.

Thirteenth Specific Example

The notification device may be a device attached to an article distributed to a notification target in the entrance area. If the distributed article has a visibly identifiable feature (hereinafter, also referred to as "identification feature"), it is possible to specify device information of the notification device held by the notification target from a captured image in which a state where the notification target holds the article is imaged. It is sufficient that the information provision control system 1 hold information in which the identification feature and the device information are associated with each other (referred to as "identification feature information") and the transmission destination determination unit 212 extract the device information associated with the identification feature of the notification device held by the notification target. It is sufficient that the identification feature information be stored in, for example, the storage device included in the authentication device 11 or the storage device included in the information provision control device 21.

For example, it is assumed that an article to be distributed be a bib having a notification device and a number assigned to identify the authentication target be printed on the bib. The information provision control system 1 holds identification feature information in which the bib number and device information of the notification device attached to the bib are associated with each other. The authentication target walks while holding the bib so that the bib number is imaged by the imaging device 4. The transmission destination determination unit 212 recognizes the bib number of the notification target and extracts the device information associated with the number in the identification feature information. The extracted device information is device information of the notification device attached to the bib held by the notification target. Accordingly, the provision device control unit 213 can instruct the notification device attached to the bib of the notification target to issue a notification on the basis of the extracted device information.

Modifications (1)

The notification device itself may have an identification feature.

(2)

The identification feature does not need to be a feature that can uniquely identify all the authentication targets. It is sufficient that the identification feature be an identification feature that can uniquely identify the notification device in a set of persons who hold notification devices.

For example, there may be an example embodiment in which the number of articles to which the notification devices are attached is smaller than the total number of authentication targets. In this case, the article to which the notification device is attached may be collected after the authentication is terminated and reused for another authentication target. Then, in this case, as long as the identification features of the articles respectively held by the multiple authentication targets are different from each other, even if the notification is issued to all the articles having the identification feature of the article held by the notification target, the notification is issued only to the notification target. Therefore, it is sufficient that the number of types of identification features be a number that does not fall below the number of passengers who may be authentication targets at one time.

[Note]

The contrivance described in any of the above specific examples may be applied to another specific example.

<Modification of Configuration>

Figure 10:
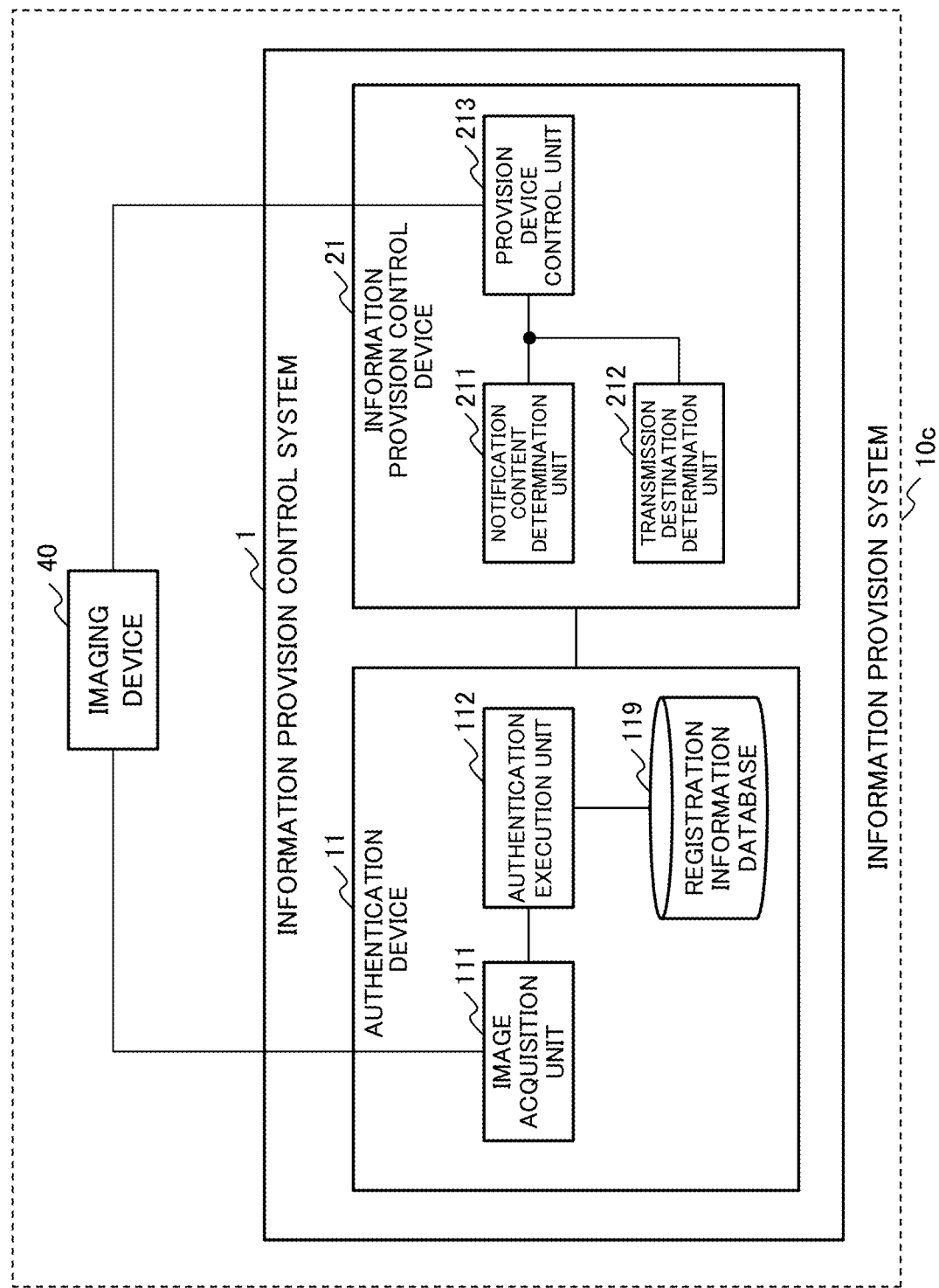
FIG. 10 is a block diagram illustrating an example of a functional configuration of an information processing system in a case where an imaging device having a function of a provision device is used.

The imaging device 4 and the provision device 7 may be integrated. FIG. 10 is a block diagram illustrating a configuration of an information processing system 100c in which an imaging device 40 having the function of the provision device 7 is adopted. In this case, the information provision system includes the imaging device 40. In FIG. 10, a reference numeral "10c" is assigned to the information provision system including the imaging device 40.

Figure 11:
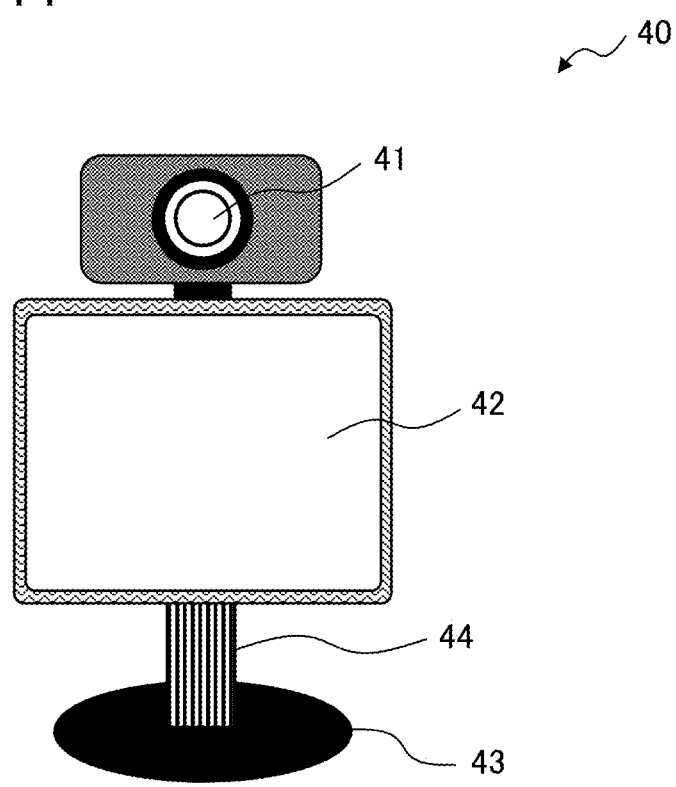
FIG. 11 is a block diagram illustrating an example of an appearance of an imaging device that has a function of a provision device.

FIG. 11 is a diagram illustrating an example of an appearance of the imaging device 40. The imaging device 40 includes an imaging unit 41, a display unit 42, a fixing unit 43, and a rotary shaft 44.

The imaging unit 41 and the display unit 42 are adjusted, for example, to face the same direction. A relationship between the direction of the imaging unit 41 and the direction of the display unit 42 may be fixed.

The fixing unit 43 is a portion fixed to a base.

The rotary shaft 44 is a portion that can change the directions of the imaging unit 41 and the display unit 42 by rotation. The provision device control unit 213 may control a direction of the rotation, an angle of the rotation, or the like.

According to such a modification, because the direction of the imaging device 4 and the direction of the provision device 7 integrally change with the same power source, a total cost (calculation cost, communication cost, temporal cost, or the like) in a case where both of the direction of the imaging device 4 and the direction of the provision device 7 are controlled is reduced. That is, in a case where the information provision control device 21a controls the direction of the provision device 7, cost to control the direction of the imaging device 4 to acquire the captured image of the authentication target may be reduced. Alternatively, in a case where the information provision control device 21a controls the direction of the imaging device 4 to acquire the captured image of the authentication target, cost to control the direction of the provision device 7 may be reduced.

<Implementation of Example Embodiment>

According to the specific examples described above, those skilled in the art would understand that the example embodiment according to the disclosure may include example embodiments expressed by the following words.

An example embodiment in which an information provision control device determines a direction of an output of a provision device according to information regarding a notification target or a situation of the notification target An example embodiment in which an information provision control system performs authentication and controls at least one of a position and a direction of the provision device in such a way that the notification target recognizes the output of the provision device An example embodiment in which the information provision control system performs authentication and controls at least one of the position or the direction of the provision device so as to control a range of the output of the provision device.

An example embodiment in which an information provision system including the information provision control system and the provision device performs authentication, determines a transmission destination, and transmits a notification to the transmission destination by controlling the provision device.

An example embodiment in which an information provision system including the information provision control system and the plurality of provision devices performs authentication, determines one of the plurality of provision devices as a transmission destination, and transmits information regarding an authentication result to the determined transmission destination.

Therefore, the authentication execution unit 112 is related to an example of the authentication unit 101. The transmission destination determination unit 212 is related to an example of the determination unit 102. The provision device 7 in any one of the specific examples described above is related to an example of the transmission unit 103. The provision device control unit 213 according to the example embodiment in which the provision device 7 is determined as the transmission destination is also related to an example of the transmission unit 103. In some example embodiments, a combination of the provision device control unit 213 and the provision device 7 may be assumed to be related to an example of the transmission unit 103.

<Example of Operation>

Hereinafter, some examples of an operation of the information processing system 100 (or information processing system 100a) will be described.

First Operation Example

Figure 12:
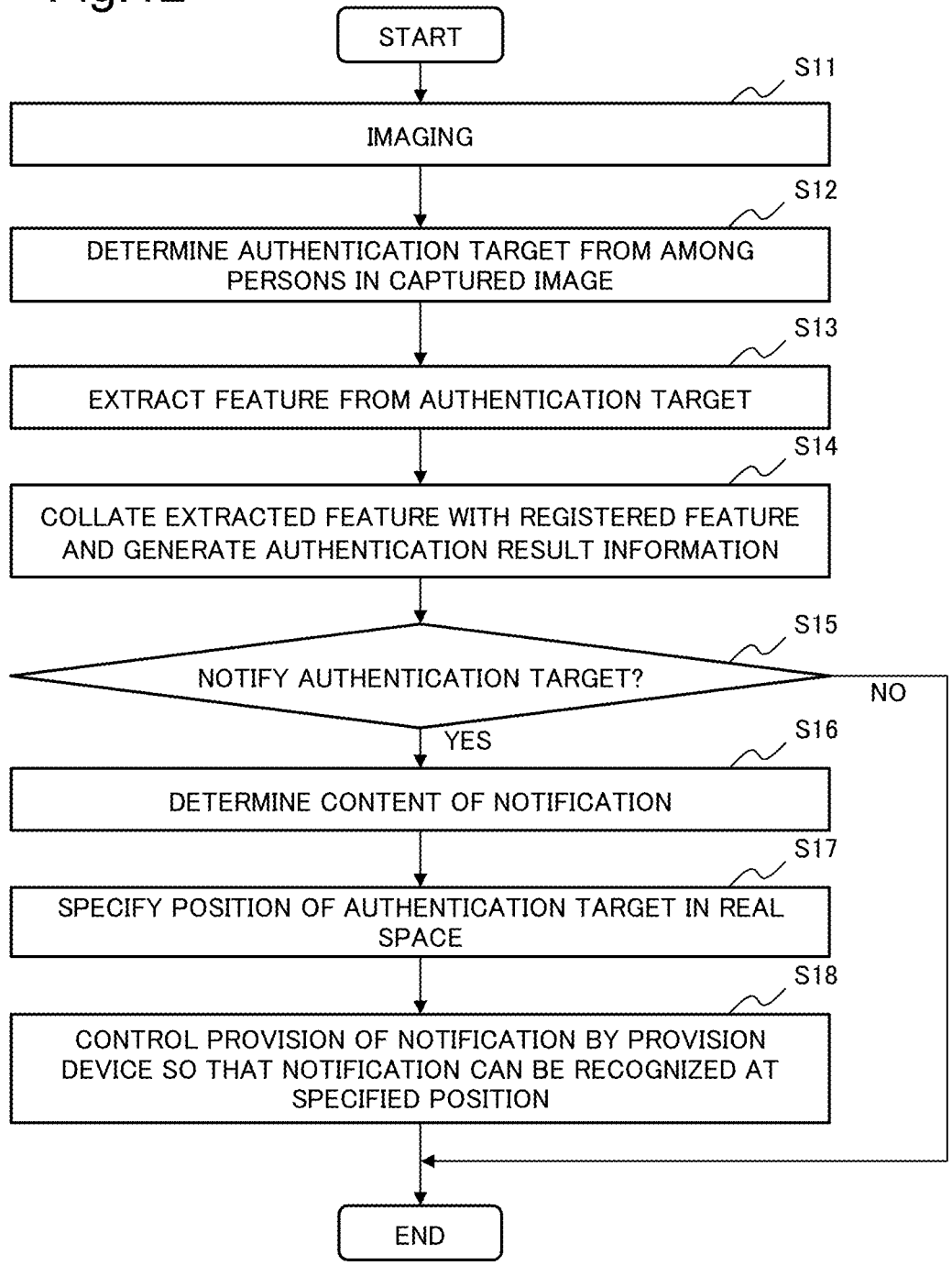
FIG. 12 is a flowchart illustrating a first operation example of the information processing system.

A first operation example will be described with reference to the flowchart in FIG. 12. The first operation example is an operation example in an example embodiment in which the provision device control unit 213 performs control according to a position of an authentication target. The position of the authentication target may be any one of positions of the foot, abdomen, head, other body portion, or a part or all of the personal belongings of the authentication target. The information indicating the position of the authentication target may be information indicating a spatial region including the entire authentication target.

First, the imaging device 4 images the authentication target (step S11). The image acquisition unit 111 of the authentication device 11 acquires a captured image generated by imaging.

Next, the authentication device 11 determines the authentication target from among persons imaged in the captured image (step S12). For example, the authentication device 11 selects one authentication target who has not been selected yet as an authentication target from among one or more persons in the captured image as an authentication target. In a case where the persons are in line along the route, it is sufficient that the authentication device 11 prioritize a person who is located forward on the route and determine the authentication target.

A well-known method may be adopted for a method for detecting a person in the captured image.

Next, the authentication execution unit 112 extracts a feature from the authentication target (step S13). Examples of the extracted features are as described above.

The authentication execution unit 112 collates the extracted feature with the registered feature registered in the registration information database 119 and generates authentication result information as a collation result (step S14). The authentication device 11 provides the generated authentication result information to the information provision control device 21a.

The information provision control device 21a may determine whether to issue a notification to the authentication target on the basis of the authentication result information (step S15). In a case where it is determined to issue a notification (YES in step S15), the information provision control device 21a executes processing from step S16 to step S18. In a case where it is determined not to issue a notification (NO in step S15), the information provision control device 21a does not need to execute any particular processing. When the processing of the information provision control device 21a is terminated, the authentication device 11 may determine an authentication target again (step S11) and execute processing in and subsequent to step S12 again.

The information provision control device 21a may determine whether to issue a notification to the authentication target, for example, on the basis of whether the authentication target is authenticated. The information provision control device 21a may determine to issue a notification to the authentication target in a case where the authentication target is authenticated and may determine not to issue a notification to the authentication target in a case where the authentication target is not authenticated. Conversely, the information provision control device 21a may determine to issue a notification to the authentication target only in a case where the authentication target is not authenticated. In addition, the information provision control device 21a may determine whether to issue a notification to the authentication target on the basis of a reference based on information regarding an attribute, an official position, an authentication history, and/or entrance area passage time of the authentication target.

In step S16, the notification content determination unit 211 determines content of the notification on the basis of the authentication result information. This processing may be executed after the processing in step S17, and the notification content determination unit 211 may determine the content of the notification according to the position of the notification target.

In step S17, the situation specifying unit 214 specifies the position of the authentication target in the real space. Then, in step S18, the provision device control unit 213 controls provision of the notification by the provision device 7 in such a way that the notification can be recognized at the position specified by the situation specifying unit 214.

First Example of Control Processing

The processing in step S18 is referred to as "provision control processing". A first example of a specific flow of the provision control processing will be described with reference to the flowchart in FIG. 13.

First, the information provision control device 21a acquires a position of the provision device 7 (step S181). In a case where the information provision control device 21a has already known the position, the processing in step S181 may be omitted.

Next, the transmission destination determination unit 212 specifies a direction from the provision device 7 to the position of the authentication target (step S182).

Next, the provision device control unit 213 instructs the provision device 7 to set the direction of the provision device 7 to be the specified direction (step S183). Then, the provision device control unit 213 outputs a notification to the provision device 7 (step S184).

After the processing in step S184, the information provision control device 21a may continue the provision control processing or may stop the provision control processing until it is determined to issue a notification to another authentication target. The provision device 7 may terminate the output of the notification after a certain period of time. The provision device control unit 213 may send an instruction to end the output to the provision device 7 after a certain period of time after the instruction is sent by the processing in step S184.

In a case where the provision control processing is continued (YES in step S185), the information provision control device 21a specifies a position of the authentication target in the real space (step S186) and executes, for example, processing from step S182 again. At this time, the notification content determination unit 211 may redetermined the content of the notification (that is, update content of notification to another content).

Second Example of Control Processing

Figure 14:
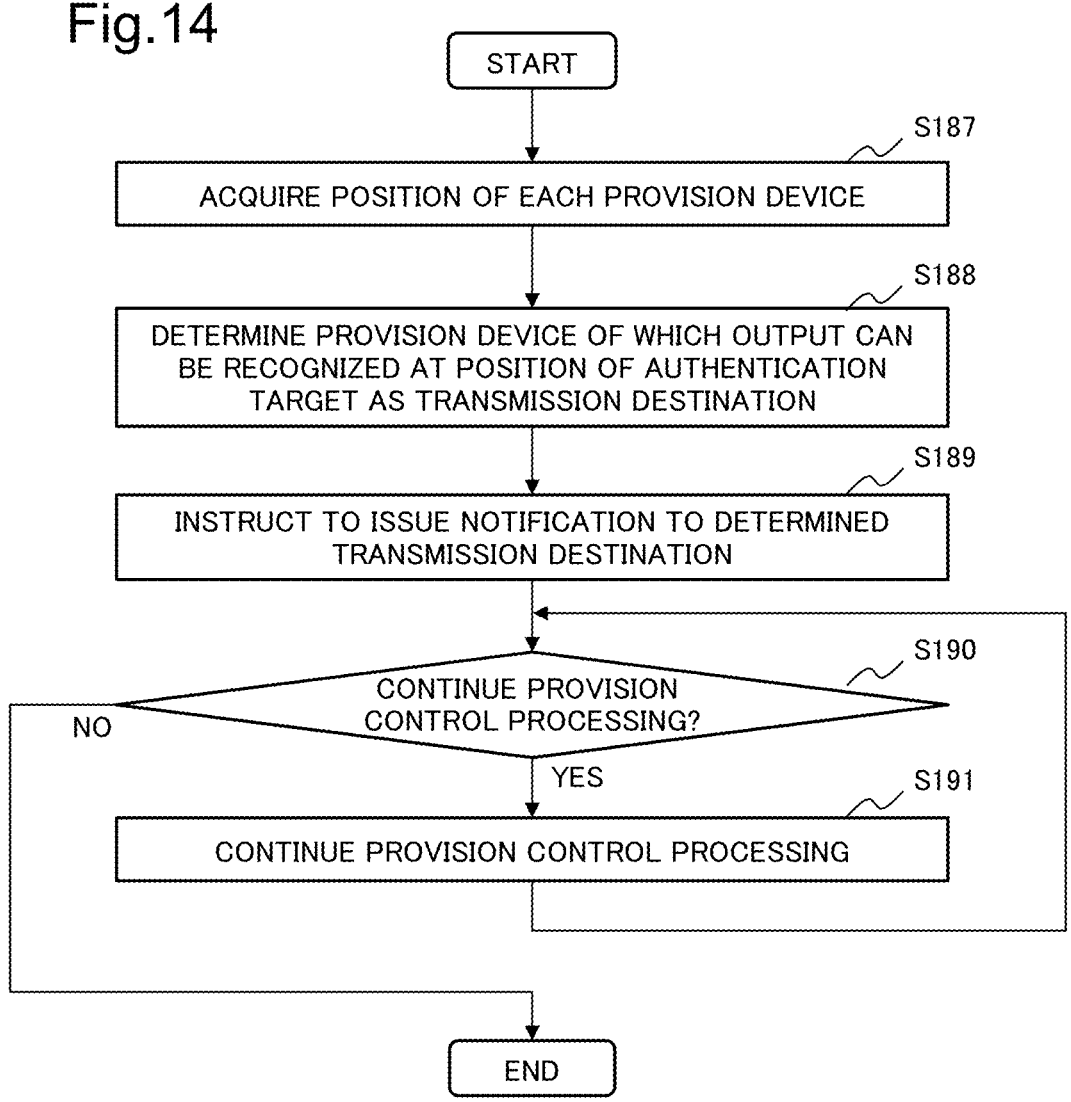
FIG. 14 is a flowchart illustrating a second specific example of the provision control processing in the first operation example.

A second example of the specific flow of the provision control processing will be described with reference to the flowchart in FIG. 14. The second example is an example in an example embodiment in which one of the plurality of provision devices 7 is specified as a transmission destination.

First, the information provision control device 21a acquires a position of each provision device (step S187). In a case where the information provision control device 21a has already known the position, the processing in step S187 may be omitted.

Next, the transmission destination determination unit 212 determines the provision device 7 of which an output can be recognized at the position of the authentication target as a transmission destination on the basis of the position of the authentication target and the position of each provision device (step S188). The transmission destination determination unit 212 may determine, for example, a provision device 7 located at the position closest to the position of the authentication target as a transmission destination.

Then, the provision device control unit 213 instructs to issue a notification to the transmission destination determined by the transmission destination determination unit 212 (step S189).

Thereafter, as long as the information provision control device 21a determines to continue the provision control processing (YES in step S190), the information provision control device 21a may continue the provision control processing (step S191). When the information provision control device 21a determines not to continue the provision control processing (NO in step S190), the information provision control device 21a may terminate the provision control processing. In a case where it is determined to execute the provision control processing on a next authentication target, the information provision control device 21a may execute the processing from step S187 again.

Second Operation Example

Figure 15:
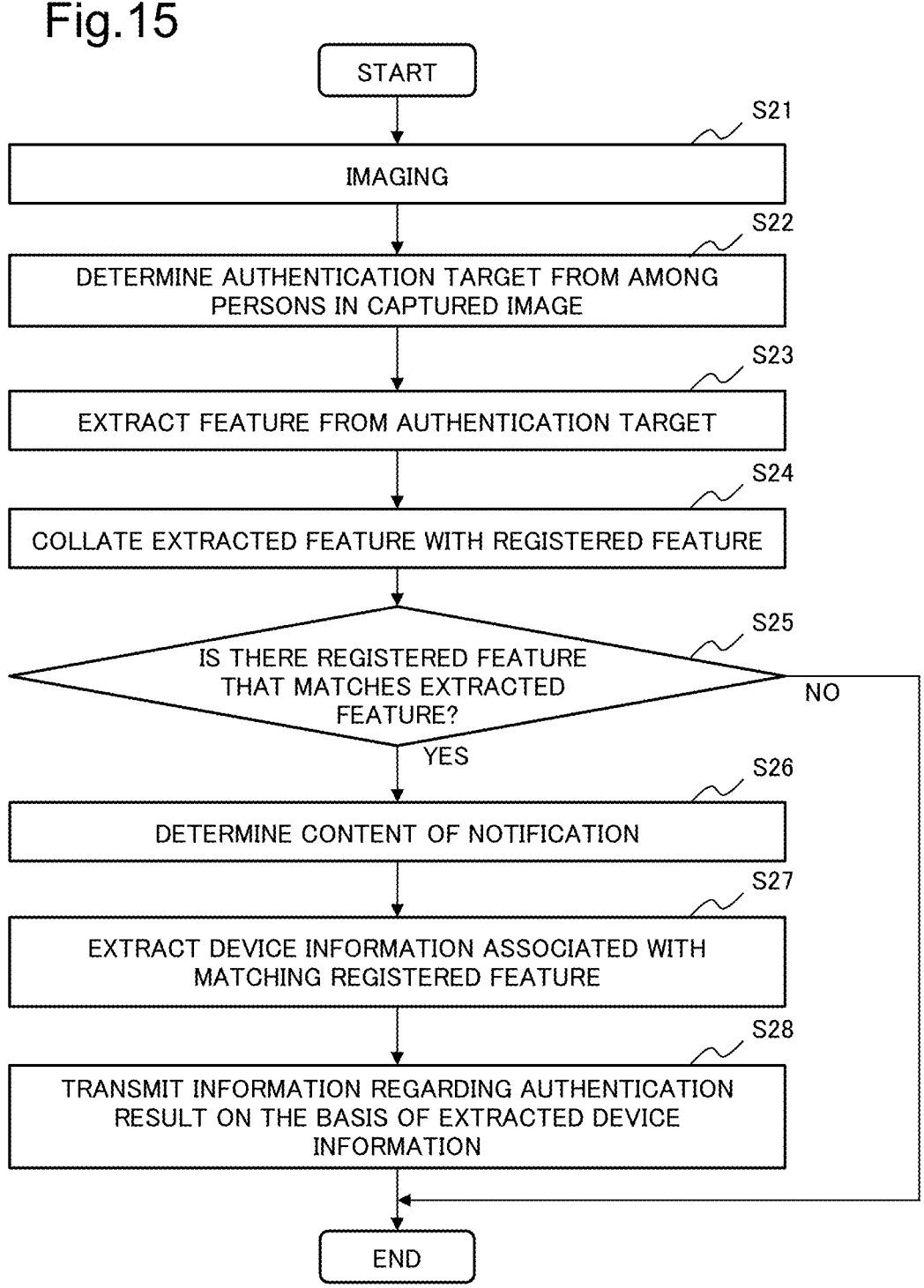
FIG. 15 is a flowchart illustrating a second operation example of the information processing system.

A second operation example will be described with reference to the flowchart in FIG. 15. The second operation example is an operation example in an example embodiment in which the provision device control unit 213 performs control according to the personal information of the authentication target. In this example embodiment, the information provision control device 21 holds possession information in which identification information of the authentication target and device information of a mobile phone to be owned by the authentication target are associated with each other.

Processing from step S21 to step S23 may be the same as the processing from step S1l to step S13 in the first operation example.

In step S24, the authentication execution unit 112 collates the feature extracted in step S23 with the registered feature. Subsequent processing differs depending on the result of the collation.

In a case where the registered feature that matches the extracted feature is included in the registration information database 119 (YES in step S25), it can be said that the authentication target is authenticated. The information provision control device 21 executes the processing from step S26 to step S28 while assuming the authenticated authentication target as a notification target.

In step S26, the notification content determination unit 211 determines content of a notification.

In step S27, the transmission destination determination unit 212 extracts the device information associated with the registered feature that is determined to match the extracted feature from the possession information. A notification device indicated by the device information is related to the transmission destination. The device information is one kind of personal information of the authenticated authentication target.

In step S28, the provision device control unit 213 transmits information regarding an authentication result on the basis of the device information extracted by the processing in step S27. For example, if the device information is a mail address, the provision device control unit 213 may transmit an e-mail in which the mail address is set as an address and the authentication result is described.

Third Operation Example

Figure 16:
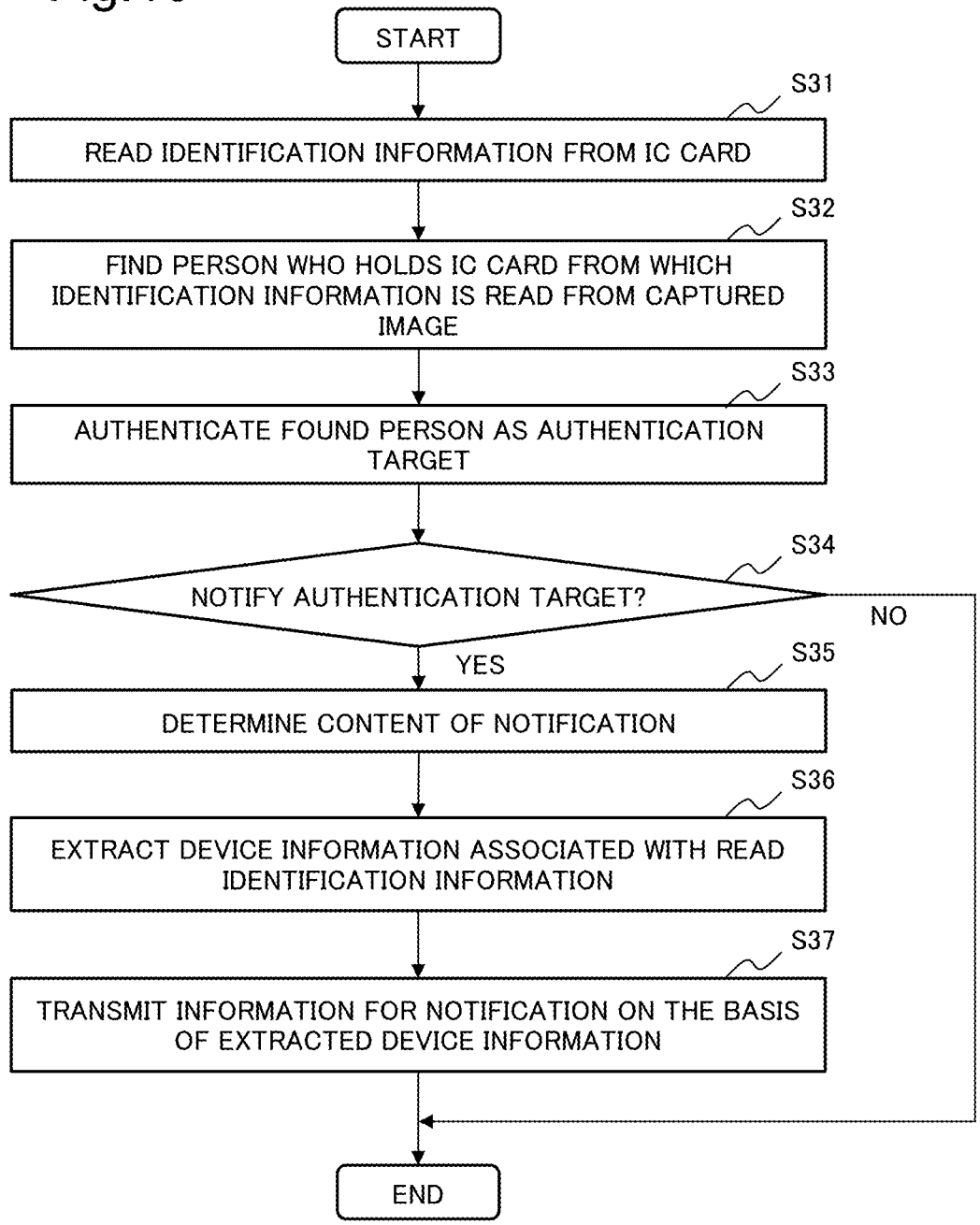
FIG. 16 is a flowchart illustrating a third operation example of the information processing system.
Figure 17:
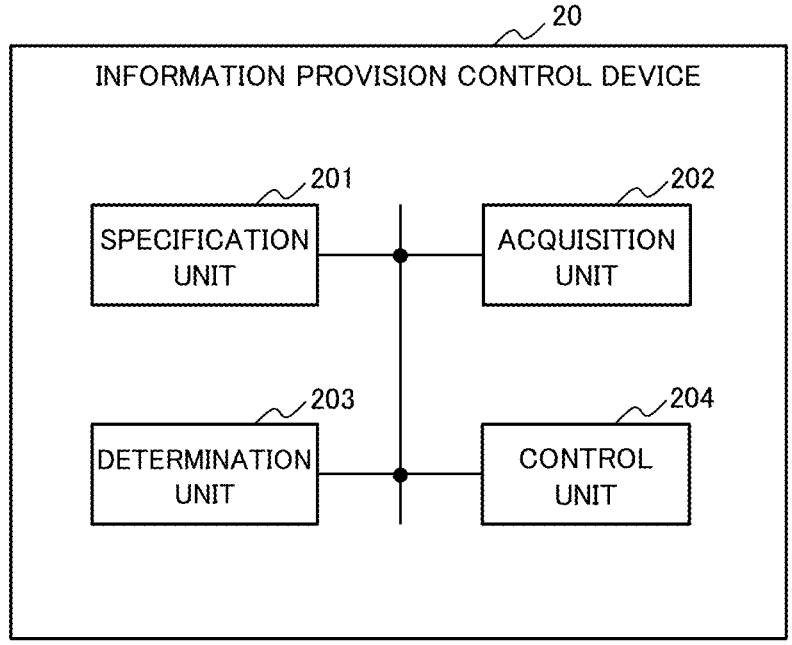
FIG. 17 is a block diagram illustrating an example of a functional configuration of an information provision control device according to one example embodiment of the disclosure.

A third operation example will be described with reference to the flowchart in FIG. 16. The third operation example is an operation example in an example embodiment in which the provision device control unit 213 performs control according to personal information read from an IC card held by a notification target. In this example embodiment, it is assumed that each passenger hold an IC card that records identification information of the passenger. The information processing system 100 includes a reading device that reads information stored in the IC card. The information provision control device 21 holds possession information in which identification information of the authentication target and device information of a mobile phone to be owned by the authentication target are associated with each other.

In this operation example, it is assumed that imaging by the imaging device 4 be continuously performed. At least one imaging device 4 images a region including the reading device.

First, the information processing system 100 reads information from the IC card owned by the passenger (step S31).

Next, the information provision control system 1 finds a person who holds the IC card from which the identification information is read from the captured image (step S32). In the example embodiment in which the position of the passenger when the identification information stored in the IC card is read is fixed, it is found that the person at a position relating to the position in the captured image when the identification information is read is the person who holds the IC card from which the identification information is read. Even in a case where the position of the passenger when the identification information is read is not fixed, if the information processing system 100 has a configuration that can specify the position of the passenger (in real space) when the identification information is read, it is possible to find the person who holds the IC card from which the identification information is read by associating the position in the real space with the position in the captured image.

When the person who holds the IC card from which the identification information is read is found, the authentication execution unit 112 authenticates the found person as an authentication target (step S33). That is, the authentication execution unit 112 extracts a feature from the captured image in which the person is imaged and collates the extracted feature with the registered feature registered in the registration information database 119. Then, the authentication execution unit 112 generates authentication result information.

The information provision control device 21 determines whether to issue a notification to the authentication target on the basis of the authentication result information (step S34). In a case where it is determined to issue a notification (YES in step S34), the information provision control device 21 executes processing from step S35 to step S37. In a case where it is determined not to issue a notification (NO in step S34), the information provision control device 21 does not need to execute any particular processing.

In step S35, the notification content determination unit 211 determines content of a notification.

In step S36, the transmission destination determination unit 212 extracts device information associated with the identification information read in step S31, from the possession information. A notification device indicated by the device information is related to the transmission destination.

In step S37, the provision device control unit 213 transmits information regarding an authentication result on the basis of the device information extracted by the processing in step S36.

Note

[Note]

An order of the processing described above is an example, and an order of processing in each step may be changed or some types of processing may be simultaneously executed in parallel without departing from the idea of the disclosure.

[Configuration of Information Provision Control Device]

Figure 18:
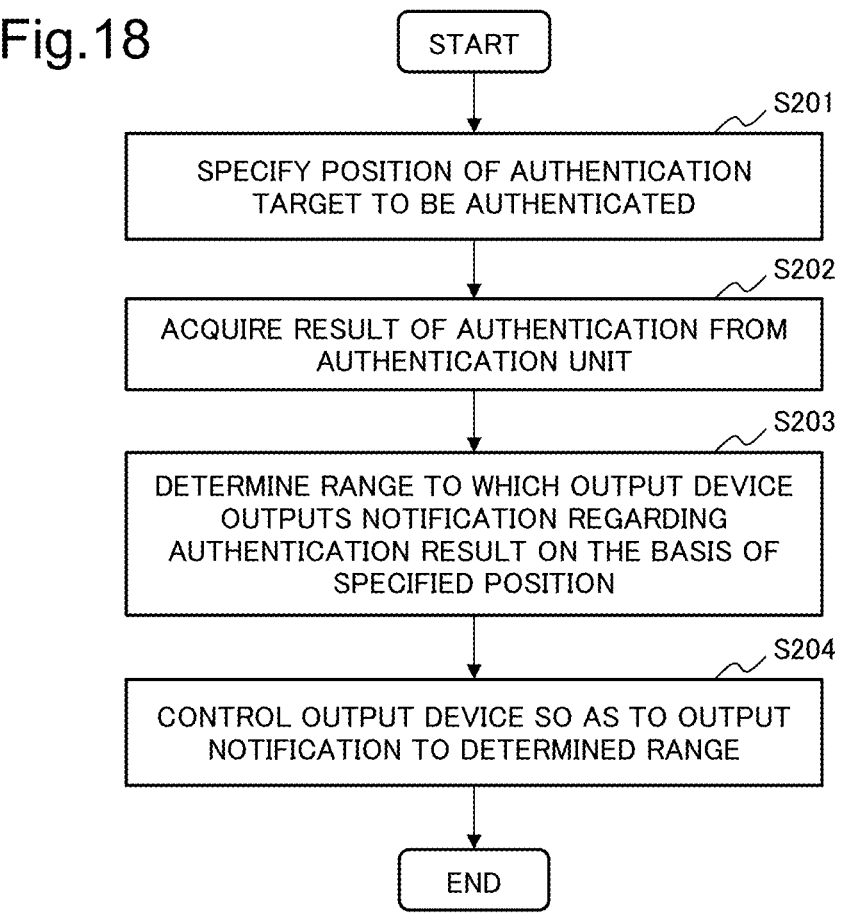
FIG. 18 is a flowchart illustrating an example of a flow of an information provision control method according to one example embodiment of the disclosure.

In the example embodiment described above, the functional configuration of the information provision control device may be expressed as illustrated in FIG. 18. An information provision control device 20 illustrated in FIG. 18 will be described.

The information provision control device 20 includes a specification unit 201, an acquisition unit 202, a determination unit 203, and a control unit 204.

The specification unit 201 specifies a position of an authentication target (in real space) to be authenticated.

The acquisition unit 202 acquires a result of the authentication from an authentication unit that authenticates the authentication target. The authentication unit may be a device that can communicate with the information provision control device 20 or may be mounted in the information provision control device 20.

The determination unit 203 determines a range to which an output device outputs a notification on the basis of the position specified by the specification unit 201. The notification is a notification regarding the result of the authentication by the authentication unit. The output device is a device that has a function for outputting a notification.

The control unit 204 controls the output device to output a notification to the range determined by the determination unit 203.

[Operation of Information Provision Control Device]

An example of a flow of processing by the information provision control device 20 will be described with reference to the flowchart in FIG. 18. First, the specification unit 201 specifies a position of an authentication target to be authenticated (step S201). The acquisition unit 202 acquires the result of the authentication from the authentication unit that authenticates the authentication target (step S202). Then, the determination unit 203 determines a range to which the output device outputs a notification regarding the result of the authentication on the basis of the position of the authentication target specified in step S201 (step S203). Then, the control unit 204 controls the output device to output the notification to the range determined in step S203 (step S204).

The order of steps is an example and may be changed unless a trouble is caused. For example, the order of step S201 and step S202 may be reversed.

The information provision control device 20 is incorporated into the information provision system that authenticates the authentication target and notifies the authentication target of the authentication result in such a way that the information provision system can more reliably and smoothly provide information regarding the authentication result to the authenticated person.

<Hardware Configuration that Implements Each Unit of Example Embodiment>

In each example embodiment of the disclosure described above, a block illustrating each component of each device is illustrated in functional units. However, the blocks illustrating the components do not necessarily mean that the components are configured by separate modules.

Processing of each component may be achieved, for example, by reading and executing a program that is stored in a computer-readable storage medium and causes a computer system to execute the processing by the computer system. The "computer-readable storage medium" is, for example, a portable medium such as an optical disk, a magnetic disk, a magneto-optical disk, or a nonvolatile semiconductor memory and a storage device such as a read only memory (ROM), a hard disk, or the like built in a computer system. The "computer-readable storage medium" includes a storage medium that can temporarily hold a program such as a volatile memory in the computer system and a storage medium that transmits a program such as a communication line such as a network or a telephone line. The program may implement a part of the above-described functions or may implement the functions described above by a combination with a program that has been already stored in the computer system.

Figure 19:
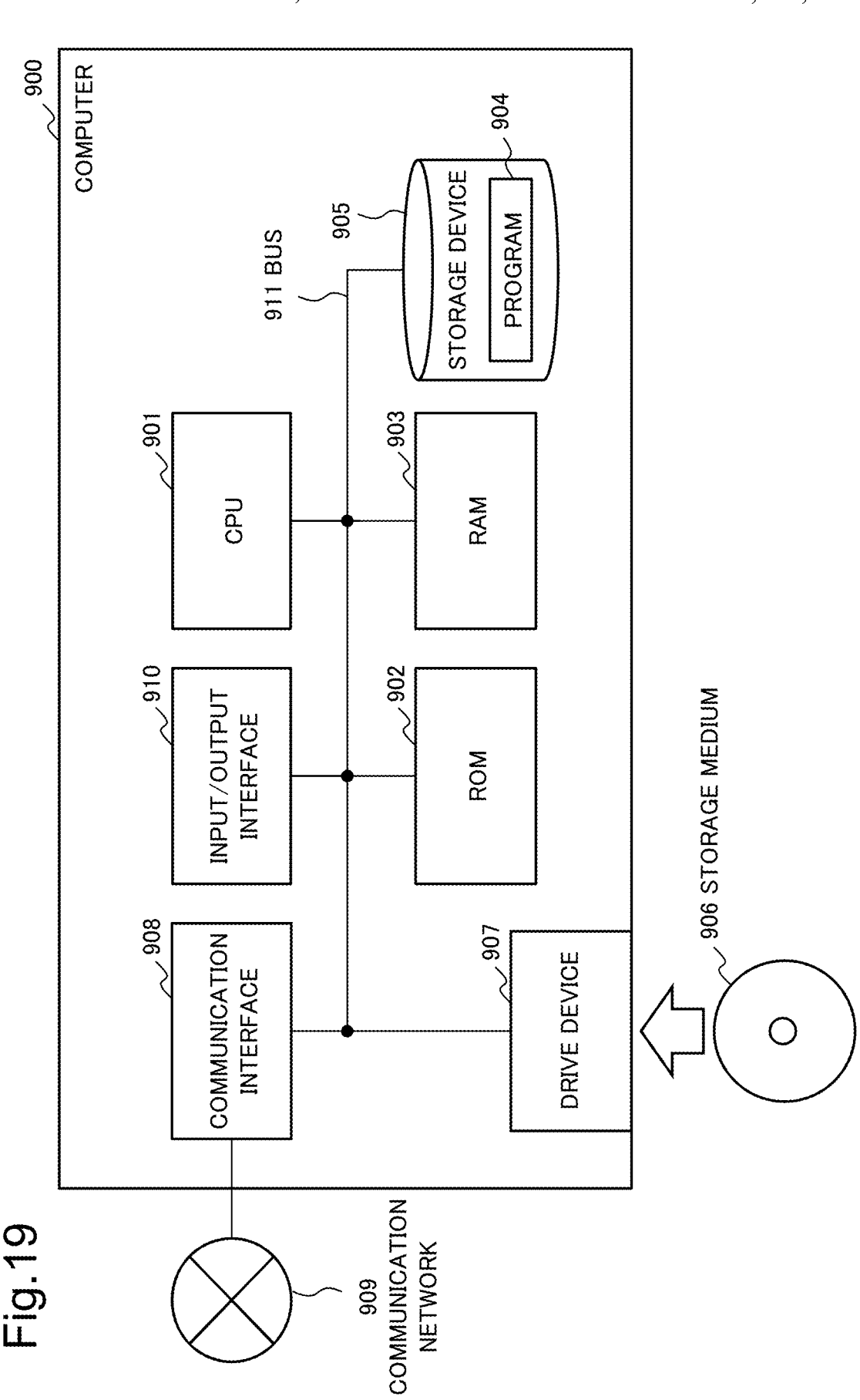
FIG. 19 is a block diagram illustrating an example of hardware configuring each unit according to each example embodiment of the disclosure.

The "computer system" is, for example, a system including a computer 900 as illustrated in FIG. 19. The computer 900 includes the following components.

- One or a plurality of central processing units (CPU) 901
- ROM 902
- Random access memory (RAM) 903
- Program 904 loaded on RAM 903
- Storage device 905 that stores program 904
- Drive device 907 that reads/writes from/to storage medium 906
- Communication interface 908 connected to communication
- network 909
- Input/output interface 910 that inputs/outputs data
- Bus 911 that connects components For example, each component of each device in each example embodiment is implemented by loading the program 904 for implementing the function of the component to the RAM 903 and executing the program 904 by the CPU 901. The program 904 for implementing the function of each component of each device is, for example, stored in the storage device 905 or the ROM 902 in advance. The CPU 901 reads the program 904 as necessary. The storage device 905 is, for example, a hard disk. The program 904 may be supplied to the CPU 901 via the communication network 909 or may be stored in the storage medium 906 in advance, read by the drive device 907, and supplied to the CPU 901. The storage medium 906 is a portable medium, for example, an optical disk, a magnetic disk, a magneto-optical disk, a nonvolatile semiconductor memory, or the like.

There are various modifications of the method for implementing each device. For example, each device may be implemented by a possible combination of a separate computer 900 and a program for each component. A plurality of components included in each device may be implemented by a possible combination of a single computer 900 and a program.

Some or all the components of each device may be implemented by another general-purpose or dedicated circuit, a computer, or a combination thereof. These may be configured by a single chip or a plurality of chips connected via a bus.

In a case where some or all of the components of each device are implemented by a plurality of computers, circuits, or the like, the plurality of computers, circuits, or the like may be centrally arranged or dispersedly arranged. For example, the computers, the circuits, or the like may be implemented as a form, in which each of the computers, the circuits, or the like is connected via a communication network, such as a client and server system, a cloud computing system, or the like.

The whole or part of the example embodiments disclosed above can be described as, but not limited to, the following supplementary notes.

SUPPLEMENTARY NOTE

[Supplementary Note 1]
An information provision system including:
authentication unit that authenticates an authentication target using an image obtained by imaging the authentication target to be authenticated;
determination unit that determine a transmission destination of information regarding a result of the authentication to notify the authentication target of the result of the authentication according to information regarding the authentication target or a situation of the authentication target; and
transmission unit that transmits the information to the determined transmission destination.

[Supplementary Note 2]
The information provision system according to supplementary note 1, further including:
situation specification unit that specify a position of the authentication target in a real space from an image in which the authentication target is imaged as the situation of the authentication target, in which
the determination unit determines the transmission destination so that the notification is recognized at the position of the authentication target in the real space.

[Supplementary Note 3]
The information provision system according to supplementary note 2, in which
the determination unit determines a region based on the position of the authentication target in the real space as the transmission destination, and
the transmission unit transmits the notification toward the region as the information using an output device having a directivity.

[Supplementary Note 4]
The information provision system according to supplementary note 3, in which
the output device is a display, and
the transmission unit transmits the notification toward the region by making the output device output a video after controlling at least one of a position and a direction of the output device.

[Supplementary Note 5]
The information provision system according to supplementary note 3, in which
the output device is a directional speaker, and the transmission unit transmits the notification toward the region by making the output device output audio after controlling at least one of a position and a direction of the output device.

[Supplementary Note 6]

The information provision system according to supplementary note 4 or 5, in which
for the single authentication target,
the situation specification unit repeatedly specifies the position of the authentication target,
the determination unit repeatedly determines the transmission destination, and
the transmission unit changes a direction of an output by the output device according to a movement of the authentication target by repeatedly controlling at least one of the position and the direction of the output device based on the transmission destination.

[Supplementary Note 7]

The information provision system according to supplementary note 2, in which
the determination unit determines one of an output device from among a plurality of output devices based on the position of the authentication target in the real space, and
the transmission unit transmits the information including an instruction to output the notification to the determined output device.

[Supplementary Note 8]

The information provision system according to supplementary note 1, further including:
storage unit that stores possession information in which personal information of the authentication target and device information of a device owned by the authentication target are associated with each other, in which
the authentication unit specifies the personal information of the authentication target by the authentication,
the determination unit acquires the device information associated with the specified personal information from the possession information and determines a device indicated by the device information as the transmission destination, and
the transmission unit instructs to issue a notification to the transmission destination based on the acquired device information.

[Supplementary Note 9]

The information provision system according to supplementary note 1, further including:
storage unit that stores possession information in which identification information of the authentication target and device information of a device owned by the authentication target are associated with each other, in which
the information provision system receives the identification information of the authentication target that has been read by a reading device and is recorded in an integrated circuit (IC) card held by the authentication target from the reading device that reads information from the IC card,
the authentication unit specifies the authentication target whose identification information has been read from the image and authenticates the specified authentication target,
the determination unit acquires the device information associated with the identification information of the authentication target and determines a device indicated by the device information as the transmission destination, and
the transmission unit instructs to issue a notification to the transmission destination based on the acquired device information.

[Supplementary Note 10]

The information provision system according to supplementary note 1, further including:
storage unit that stores feature information in which a feature of an article is associated with device information of a notification device distributed together with the article regarding the notification device that has a function for issuing a notification and a plurality of the articles distributed to the authentication target, in which
the determination unit acquires the device information associated with the article held by the authentication target based on an image of the authentication target who holds the article, and determines the notification device indicated by the device information as the transmission destination, and
the transmission unit instructs to issue a notification to the transmission destination based on the acquired device information.

[Supplementary Note 11]

An information provision method including:
authenticating an authentication target using an image obtained by imaging the authentication target to be authenticated;
determining a transmission destination of information regarding a result of the authentication to notify the authentication target of the result of the authentication according to information regarding the authentication target or a situation of the authentication target; and
transmitting the information to the determined transmission destination.

[Supplementary Note 12]

The information provision method according to supplementary note 11, further including:
specifying a position of the authentication target in a real space from an image in which the authentication target is imaged as the situation of the authentication target, and
determining the transmission destination in such a way that the notification is recognized at the position of the authentication target in the real space.

[Supplementary Note 13]

The information provision method according to supplementary note 12, further including:
determining a region based on the position of the authentication target in the real space as the transmission destination, and
transmitting the notification toward the region as the information using an output device having a directivity.

[Supplementary Note 14]

The information provision method according to supplementary note 13, in which
the output device is a display, and further including:
transmitting the notification toward the region by making the output device output a video after controlling at least one of a position and a direction of the output device.

[Supplementary Note 15]

The information provision method according to supplementary note 13, in which
the output device is a directional speaker, and further including:
transmitting the notification toward the region by making the output device output audio after controlling at least one of a position and a direction of the output device.

[Supplementary Note 16]

The information provision method according to supplementary note 14 or 15, further including:

for the single authentication target, repeatedly specifying the position of the authentication target, repeatedly determining the transmission destination, and changing a direction of an output by the output device according to a movement of the authentication target by repeatedly controlling at least one of the position and the direction of the output device based on the transmission destination.

[Supplementary Note 17]

The information provision method according to supplementary note 12, further including:

determining one of an output device from among a plurality of output devices based on the position of the authentication target in the real space, and transmitting the information including an instruction to output the notification to the determined output device.

[Supplementary Note 18]

The information provision method according to supplementary note 11, further including:

storing possession information in which personal information of the authentication target and device information of a device owned by the authentication target are associated with each other, specifying the personal information of the authentication target by the authentication, acquiring the device information associated with the specified personal information from the possession information and determining a device indicated by the acquired device information is determined as the transmission destination, and performing an instruction to issue a notification to the transmission destination based on the acquired device information.

[Supplementary Note 19]

The information provision method according to supplementary note 11, further including:

storing possession information in which identification information of the authentication target and device information of a device owned by the authentication target are associated with each other, receiving the identification information of the authentication target that has been read by a reading device and is recorded in an integrated circuit (IC) card held by the authentication target from the reading device that reads information from the IC card, specifying the authentication target whose identification information has been read from the image, and authenticating the specified authentication target, acquiring the device information associated with the identification information of the authentication target, and determining a device indicated by the device information as the transmission destination, and performing instruction to issue a notification to the transmission destination based on the acquired device information.

[Supplementary Note 20]

The information provision method according to supplementary note 11, further including:

storing feature information in which a feature of an article is associated with device information of a notification device distributed together with the article regarding the notification device that has a function for issuing a notification and a plurality of the articles distributed to the authentication target, acquiring the device information associated with the article held by the authentication target based on an image of the authentication target who holds the article, and determining the notification device indicated by the device information as the transmission destination, and performing an instruction to issue a notification to the transmission destination based on the acquired device information.

[Supplementary Note 21]

A computer-readable storage medium that stores a program for causing a computer to execute processing including:

authentication processing for authenticating an authentication target using an image obtained by imaging the authentication target to be authenticated;

determination processing for determining a transmission destination of information regarding a result of the authentication to notify the authentication target of the result of the authentication according to information regarding the authentication target or a situation of the authentication target; and transmission processing for transmitting the information to the determined transmission destination.

[Supplementary Note 22]

The storage medium according to supplementary note 21 that stores the program for causing the computer to execute processing further including:

situation specification processing for specifying a position of the authentication target in a real space from an image in which the authentication target is imaged as the situation of the authentication target, in which the determination processing determines the transmission destination in such a way that the notification is recognized at the position of the authentication target in the real space.

[Supplementary Note 23]

The storage medium according to supplementary note 22, in which the computer includes an output device having a directivity, the determination processing determines a region based on the position of the authentication target in the real space as the transmission destination, and the transmission processing transmits the notification toward the region as the information using the output device.

[Supplementary Note 24]

The storage medium according to supplementary note 23, in which the output device is a display, and the transmission processing transmits the notification toward the region by making the output device output a video after controlling at least one of a position and a direction of the output device.

[Supplementary Note 25]

The storage medium according to supplementary note 23, in which the output device is a directional speaker, and the transmission processing transmits the notification toward the region by making the output device output audio after controlling at least one of a position and a direction of the output device.

[Supplementary Note 26]

The storage medium according to supplementary note 24 or 25, in which the program causes the computer to repeatedly execute the situation specification processing, the determination processing, and the transmission processing for the single authentication target in such a way as to change a direction of an output by the output device according to a movement of the authentication target.

[Supplementary Note 27]

The storage medium according to supplementary note 22, in which
the determination processing determines one of an output device from among a plurality of output devices based on the position of the authentication target in the real space, and
the transmission processing transmits the information including an instruction to output the notification to the determined output device.

[Supplementary Note 28]

The storage medium according to supplementary note 21 that stores the program for causing the computer to further execute processing including:
storage processing for storing possession information in which personal information of the authentication target and device information of a device owned by the authentication target are associated with each other, in which
the authentication processing specifies the personal information of the authentication target by the authentication,
the determination processing acquires the device information associated with the specified personal information from the possession information and determines a device indicated by the device information as the transmission destination, and
the transmission processing instructs to issue a notification to the transmission destination based on the acquired device information.

[Supplementary Note 29]

The storage medium according to supplementary note 21 that stores the program for causing the computer to execute processing further including:
storage processing for storing possession information in which identification information of the authentication target and device information of a device owned by the authentication target are associated with each other; and
reception processing for receiving the identification information of the authentication target that has been read by a reading device and is recorded in an integrated circuit (IC) card held by the authentication target from the reading device that reads information from the IC card, in which
the authentication processing specifies the authentication target whose identification information has been read from the image and authenticates the specified authentication target,
the determination processing acquires the device information associated with the identification information of the authentication target and determines a device indicated by the device information as the transmission destination, and
the transmission processing instructs to issue a notification to the transmission destination based on the acquired device information.

[Supplementary Note 30]

The storage medium according to supplementary note 21 that stores the program for causing the computer to execute processing further including:
storage processing for storing feature information in which a feature of an article is associated with device information of a notification device distributed together with the article regarding the notification device that has a function for issuing a notification and a plurality of the articles distributed to the authentication target, in which
the determination processing acquires the device information associated with the article held by the authentication target based on an image of the authentication target who holds the article, and determines the notification device indicated by the device information as the transmission destination, and
the transmission processing instructs to issue a notification to the transmission destination based on the acquired device information.

[Supplementary Note 31]

An information provision control device including:
specification unit that specifies a position of an authentication target to be authenticated;
acquisition unit that acquires a result of authentication from authentication means that authenticates the authentication target;
determination unit that determines a range to which an output device that outputs a notification regarding the result of the authentication outputs the notification, based on the specified position; and
control unit that controls the output device to output the notification to the determined range.

[Supplementary Note 32]

An information provision control method including:
specifying a position of an authentication target to be authenticated;
acquiring a result of authentication from authentication means that authenticates the authentication target;
determining a range to which an output device that outputs a notification regarding the result of the authentication outputs the notification, based on the specified position; and
controlling the output device to output the notification to the determined range.

[Supplementary Note 33]

A computer-readable storage medium that stores a program for causing a computer to execute processing including:
specification processing for specifying a position of an authentication target to be authenticated;
acquisition processing for acquiring a result of authentication from authentication means that authenticates the authentication target;
determination processing for determining a range to which an output device that outputs a notification regarding the result of the authentication outputs the notification, based on the specified position; and
control processing for controlling the output device to output the notification to the determined range.

The disclosure is not limited to these example embodiments. It will be understood by those of ordinary skill in the art that various changes in form and details may be made therein without departing from the spirit and scope of the disclosure as defined by the claims.

REFERENCE SIGNS LIST 1 information provision control system
100, 100a to 100c information processing system
4 imaging device
7 provision device
7a display 7b projector
7c speaker
9 reading device
10 information provision system
101 authentication unit
102 determination unit
103 transmission unit
11 authentication device
111 image acquisition unit
112 authentication execution unit
119 registration information database
21, 21a information provision control device
211 notification content determination unit
212 transmission destination determination unit
213 provision device control unit
40 imaging device
41 imaging unit
42 display unit
43 fixing unit
44 rotary shaft
900 computer
901 CPU
902 ROM
903 RAM
904 program
905 storage device
906 storage medium
907 drive device
908 communication interface
909 communication network
910 input/output interface
911 bus

What is claimed is:

1. An information provision system comprising:
a memory; and
at least one processor coupled to the memory,
the at least one processor performing operations to:
store, for each of a plurality of articles distributed to an authentication target, feature information in which a feature of the article is associated with device information of a notification device;
authenticate an authentication target using an image obtained by imaging the authentication target, the authentication target holding one of the plurality of articles in the image;
acquire the device information associated with the one of the plurality of articles held by the authentication target in the image, based on the feature information for the one of the plurality of articles held by the authentication target in the image;
determine a transmission destination of information regarding a result of the authentication to notify the authentication target of the result of the authentication according to information regarding the authentication target or a situation of the authentication target, the transmission destination including the notification device indicated by the device information associated with the one of the plurality of articles held by the authentication target in the image; and
transmit the information to the determined transmission destination, including instructing the notification device indicated by the device notification associated with the one of the plurality of articles held by the authentication target in the image to issue a notification of the information regarding the result of the authentication.

2. The information provision system according to claim 1, wherein the at least one processor further performs operation to:
specify a position of the authentication target in a real space from the image, as a situation of the authentication target, and
wherein the transmission destination is determined in such a way that the notification is recognized at the position of the authentication target in the real space.

3. The information provision system according to claim 2, wherein
a region is determined as part of the transmission destination based on the position of the authentication target in the real space, and
the notification is transmitted toward the region using an output device having a directivity.

4. The information provision system according to claim 3, wherein
the output device is a display, and
the notification is transmitted toward the region by causing the output device to output a video after controlling at least one of a position and a direction of the output device.

5. The information provision system according to claim 3, wherein
the output device is a directional speaker, and
the notification is transmitted toward the region by causing the output device to output audio after controlling at least one of a position and a direction of the output device.

6. The information provision system according to claim 4, wherein the at least one processor further performs operation to:
repeatedly specify the position of the authentication target;
repeatedly determine the transmission destination; and
change a direction of output by the output device according to a movement of the authentication target by repeatedly controlling at least one of the position and the direction of the output device based on the transmission destination.

7. The information provision system according to claim 2, wherein the at least one processor further performs operation to:
determine an output device from among a plurality of output devices based on the position of the authentication target in the real space, and
the information including an instruction to output the notification is transmitted to the determined output device.

8. The information provision system according to claim 1, wherein the at least one processor further performs operation to:
store possession information in which personal information of the authentication target and device information of a device owned by the authentication target are associated with each other;
specify the personal information of the authentication target as a result of authenticating the authentication target;
acquire the device information associated with the specified personal information from the possession information and determine the device indicated by the device information as part of the transmission destination, and
instruct the device indicated by the device information to issue the notification.

9. The information provision system according to claim 1, wherein the at least one processor further performs operation to:

store possession information in which identification information of the authentication target and device information of a device owned by the authentication target are associated with each other;

receive the identification information of the authentication target that has been read by a reading device and is recorded in an integrated circuit (IC) card held by the authentication target from the reading device that reads information from the IC card;

specify the authentication target whose having the identification information that has been read from the image and authenticate the specified authentication target;

acquire the device information associated with the identification information of the authentication target and determine the device indicated by the device information as part of the transmission destination, and instruct the device indicated by the device information to issue the notification.

10. The information provision system according to claim 1, wherein a number assigned to identify the authentication target is printed on the article held by the authentication target, and the image includes the number.

11. An information provision method comprising:

storing, by a processor and for each of a plurality of articles distributed to an authentication target, feature information in which a feature of the article is associated with device information of a notification device;

authenticating, by the processor, an authentication target using an image obtained by imaging the authentication target, the authentication target holding one of the plurality of articles in the image;

acquiring, by the processor, the device information associated with the one of the plurality of articles held by the authentication target in the image, based on the feature information for the one of the plurality of articles held by the authentication target in the image;

determining, by the processor, a transmission destination of information regarding a result of the authentication to notify the authentication target of the result of the authentication according to information regarding the authentication target or a situation of the authentication target, the transmission destination including the notification device indicated by the device information associated with the one of the plurality of articles held by the authentication target in the image; and transmitting, by the processor, the information to the determined transmission destination, including instructing the notification device indicated by the device notification associated with the one of the plurality of articles held by the authentication target in the image to issue a notification of the information regarding the result of the authentication.

12. A non-transitory computer-readable storage medium storing a program that is executable by a computer to perform:

storing for each of a plurality of articles distributed to an authentication target, feature information in which a feature of the article is associated with device information of a notification device;

authenticating an authentication target using an image obtained by imaging the authentication target, the authentication target holding one of the plurality of articles in the image;

acquiring the device information associated with the one of the plurality of articles held by the authentication target in the image, based on the feature information for the one of the plurality of articles held by the authentication target in the image;

determining a transmission destination of information regarding a result of the authentication to notify the authentication target of the result of the authentication according to information regarding the authentication target or a situation of the authentication target, the transmission destination including the notification device indicated by the device information associated with the one of the plurality of articles held by the authentication target in the image; and transmitting the information to the determined transmission destination, including instructing the notification device indicated by the device notification associated with the one of the plurality of articles held by the authentication target in the image to issue a notification of the information regarding the result of the authentication.

\* \* \* \* \*